US010866794B1

(12) United States Patent
Sousa et al.

(10) Patent No.: US 10,866,794 B1
(45) Date of Patent: Dec. 15, 2020

(54) AUTOMATIC APPLICATION INSTALLATION AND INTEGRATION AT AN ENTERPRISE LEVEL BASED ON A SINGLE INSTALL REQUEST

(71) Applicant: Talkdesk, Inc, San Francisco, CA (US)

(72) Inventors: Tiago Sousa, Lisbon (PT); Raoul Felix, Lisbon (PT)

(73) Assignee: TALKDESK INC., San Francisco, CA (US)

( * ) Notice: Subject to any disclaimer, the term of this patent is extended or adjusted under 35 U.S.C. 154(b) by 0 days.

(21) Appl. No.: 16/418,802

(22) Filed: May 21, 2019

(51) Int. Cl.
 *G06F 8/61* (2018.01)
 *H04L 29/06* (2006.01)
(52) U.S. Cl.
 CPC .............. *G06F 8/61* (2013.01); *H04L 63/083* (2013.01); *H04L 63/0815* (2013.01)
(58) Field of Classification Search
 CPC G06F 8/60–71; H04L 63/0815; H04L 63/083
 USPC ................................................. 717/168–178
 See application file for complete search history.

(56) References Cited

U.S. PATENT DOCUMENTS

| | | | | |
|---|---|---|---|---|
| 7,290,257 B2 * | 10/2007 | Henig | ........................ | G06F 8/60 717/176 |
| 7,778,968 B2 * | 8/2010 | Cherry | ....................... | G06F 8/71 707/611 |
| 8,990,699 B2 * | 3/2015 | Pugh | ........................ | G06F 21/41 715/738 |
| 9,148,456 B2 * | 9/2015 | Vendrow | ............. | H04L 65/1083 |
| 9,710,261 B2 * | 7/2017 | Frankin | ...................... | G06F 8/71 |
| 9,792,585 B2 * | 10/2017 | Pereira | ................... | G06Q 10/10 |
| 10,467,241 B2 * | 11/2019 | Thayer | ................... | G06F 9/5072 |
| 2003/0018964 A1 * | 1/2003 | Fox | ........................... | G06F 8/61 717/177 |
| 2004/0044694 A1 * | 3/2004 | Henig | ........................ | G06F 8/60 |
| 2007/0100903 A1 * | 5/2007 | Cherry | ....................... | G06F 8/71 |

(Continued)

OTHER PUBLICATIONS

Bussler, C., Software as a Service: ASP and ASP Aggregation, SIGMOD '02: Proceedings of the 2002 ACM SIGMOD international conference on Management of data, Jun. 2002, p. 638, [retrieved on Aug. 3, 2020], Retrieved from the Internet.*

(Continued)

*Primary Examiner* — Geoffrey R St Leger

(57) ABSTRACT

The present disclosure relates to systems, methods, and non-transitory computer readable media for automatically providing access to multiple user accounts associated with an enterprise account based on a single install request. In so doing, the disclosed systems can rapidly and automatically integrate a developer system with the enterprise account. For example, the disclosed systems can, for a requested application created by a developer system, determine application ID and authentication credential pairs unique to each user account that enable secure, independent access to the requested application for each user account. In addition, the disclosed systems can provide such access to the requested application on user devices through the associated user accounts without users having to separately login to the requested application. Further, the disclosed systems can handle access changes on an individual user account basis while maintaining cross-system synchronization.

20 Claims, 18 Drawing Sheets

(56) References Cited

U.S. PATENT DOCUMENTS

| | | | | |
|---|---|---|---|---|
| 2008/0148253 A1* | 6/2008 | Badwe | ............... | G06F 21/10 |
| | | | | 717/174 |
| 2010/0175060 A1* | 7/2010 | Boykin | ............... | G06F 8/61 |
| | | | | 717/173 |
| 2011/0276939 A1* | 11/2011 | Frankin | ............... | G06F 8/71 |
| | | | | 717/101 |
| 2012/0032945 A1* | 2/2012 | Dare | ............... | G06F 9/451 |
| | | | | 345/418 |
| 2012/0054625 A1* | 3/2012 | Pugh | ............... | H04L 67/02 |
| | | | | 715/736 |
| 2012/0198438 A1* | 8/2012 | Auer | ............... | G06F 8/61 |
| | | | | 717/176 |
| 2013/0346268 A1* | 12/2013 | Pereira | ............... | G06F 8/65 |
| | | | | 705/34 |
| 2014/0173119 A1* | 6/2014 | Vendrow | ............... | H04M 3/2254 |
| | | | | 709/227 |
| 2015/0074659 A1* | 3/2015 | Madsen | ............... | G06F 9/45558 |
| | | | | 717/177 |
| 2017/0251013 A1* | 8/2017 | Kirti | ............... | H04L 63/1441 |

OTHER PUBLICATIONS

Hintze, D., et al., Towards Transparent Multi-Device-Authentication, Proceedings of the 2015 ACM International Joint Conference on Pervasive and Ubiquitous Computing and the 2015 ACM International Symposium on Wearable Computers, Sep. 2015, pp. 435-440, [retrieved on Aug. 3, 2020], Retrieved from the Internet.*

* cited by examiner

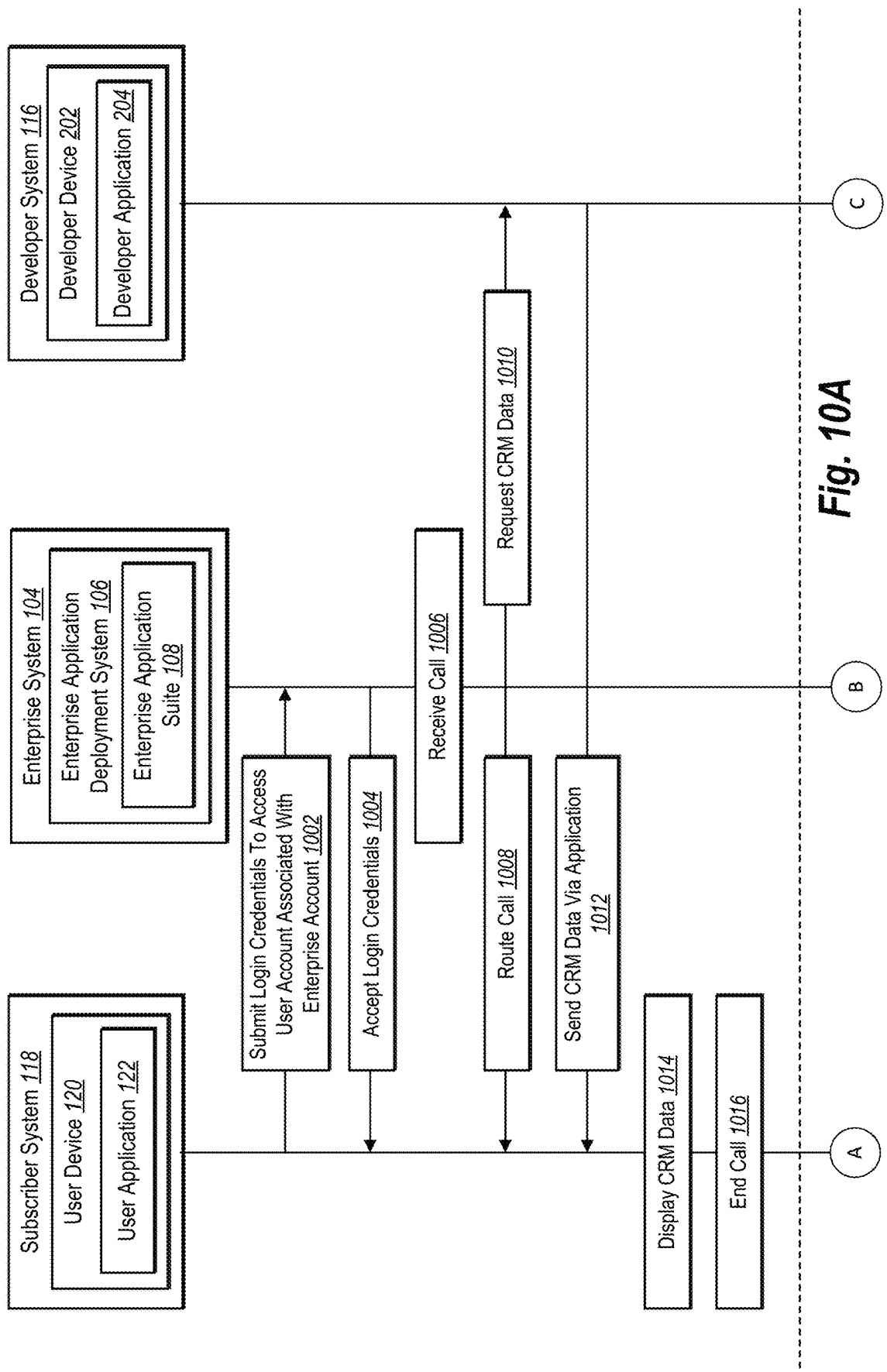

AUTOMATIC APPLICATION INSTALLATION AND INTEGRATION AT AN ENTERPRISE LEVEL BASED ON A SINGLE INSTALL REQUEST

BACKGROUND

Recent years have seen significant improvements in computer systems and software applications for implementing solutions relevant to generating and analyzing data of enterprises like call center enterprises. For example, conventional call center systems in tandem with specialized employees collect, analyze, and export large volumes of usage data from operational platforms to specialized tools. Such specialized tools help improve business and system operations. Additionally, specialized tools can include, for example, Workforce Management, Workforce Optimization, Quality Assurance, Advanced Reporting, and Voice Analytics. However, a number of problems exist with conventional call center systems, particularly in relation to efficiency of operation with specialized tools.

As one example, conventional call center systems are unable to integrate collected usage data into specialized tools without specially trained employees who export, transform, and import data into the correct tools, or, if automated, through custom system integration projects that can take weeks of specialized and expensive engineering efforts. In either scenario, conventional call center systems use large amounts of system bandwidth and processing capacity during initial integration of usage data into specialized tools. Moreover, without specialized employees and/or custom-created integration projects, conventional call center systems are unable to integrate usage data into the numerous specialized tools available. In this manner, conventional call center systems can require excessive time and user interaction with user interfaces and system hardware/software. Further, in some cases, initial integration of usage data into specialized tools even causes downtime and/or lag for conventional call center systems. Accordingly, conventional call center systems fail to operate efficiently and independently during initial integration of usage data into specialized tools.

In addition to inefficiency and dependency during initial integration of usage data into specialized tools, conventional call center systems add further inefficiencies by requiring manual, individual software downloads of the specialized tools described above at each user device in the conventional call center system of a call center enterprise. For instance, a supervisor may download a Workforce Management application on her admin device, along with purchasing sufficient licenses of the Workforce Management application for her team of call agents. Each call agent must then download the Workforce Management application at respective user devices prior to any integration of usage data mentioned above into the Workforce Management application. Delays, shift changes, system downtime, call waiting time, and/or many other factors help to exacerbate this incongruent approach. Indeed, such an onboarding process for application deployment across an enterprise slows the initial integration of usage data into specialized tools. Further, the slowed initial integration can cause a conventional call center system to produce inaccurate, partial, useless, or skewed usage data.

In another example, conventional call center systems integrated with specialized tools often require multiple logins, for example, at least one login for the conventional call center system and another separate login explicitly for the specialized tool. This multi-login process becomes quite onerous as the number of specialized tools increases, requiring additional user interactions and time with user interfaces to enter different username and/or password information for a same identity. Further, conventional call center systems can experience lower levels of security due to password fatigue and higher strain on system bandwidth from increased work flows opened to resolve login issues that coincide with multi-logins for specialized tools.

These along with additional problems and issues exist with regard to conventional call center systems.

SUMMARY

Embodiments of the present disclosure provide benefits and/or solve one or more of the foregoing or other problems in the art with systems, non-transitory computer-readable media, and methods for enterprise application deployment systems. For example, in some embodiments, the disclosed systems can use a one-click install process to integrate a third-party application (e.g., a call center as a service "CCaaS" application) with an enterprise account (e.g., an enterprise account within a CCaaS system). Specifically, the disclosed systems can receive from a user device corresponding to a user associated with the enterprise account (e.g., an administrator user) a request to install an application included in an enterprise application suite. Based on receiving the selection, the system can initiate and complete an automated application integration process across all user accounts of the enterprise account, or a select subset of user accounts of the enterprise account, with minimal to no additional user interaction. Moreover, based on the automatic integration process, the system provides the user accounts of the enterprise account authenticated access to the integrated application simply based on the user accessing the enterprise account and without the users needing to setup or perform additional logins to the integrated application. In this manner, the disclosed systems provide improved efficiency and enhanced user experiences by facilitating rapid integration between the enterprise account and the developer system of the application and by creating a fully automated, self-service platform.

As mentioned above, embodiments of the present disclosure provide benefits and/or solve one or more of the foregoing or other problems in the art. In particular, the disclosed systems solve several aspects of integration issues typical of conventional systems. For example, the disclosed systems can efficiently and independently integrate third-party applications with an enterprise account automatically within seconds or minutes, thereby omitting excessive time and user interaction with user interfaces and system hardware/software, and thereby also avoiding downtime and/or lag. Additionally, for example, the disclosed systems can remove steps of manual, individual software downloads of third-party applications by providing automatic access to approved users through their enterprise user accounts. In turn, the disclosed systems can increase security by decreasing password fatigue and can increase bandwidth by decreasing a number of open workflows for login issues.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 10A-10B illustrate an example sequence flow for responding to a subscribed event in accordance with one or more embodiments;

DETAILED DESCRIPTION

Figure 1:
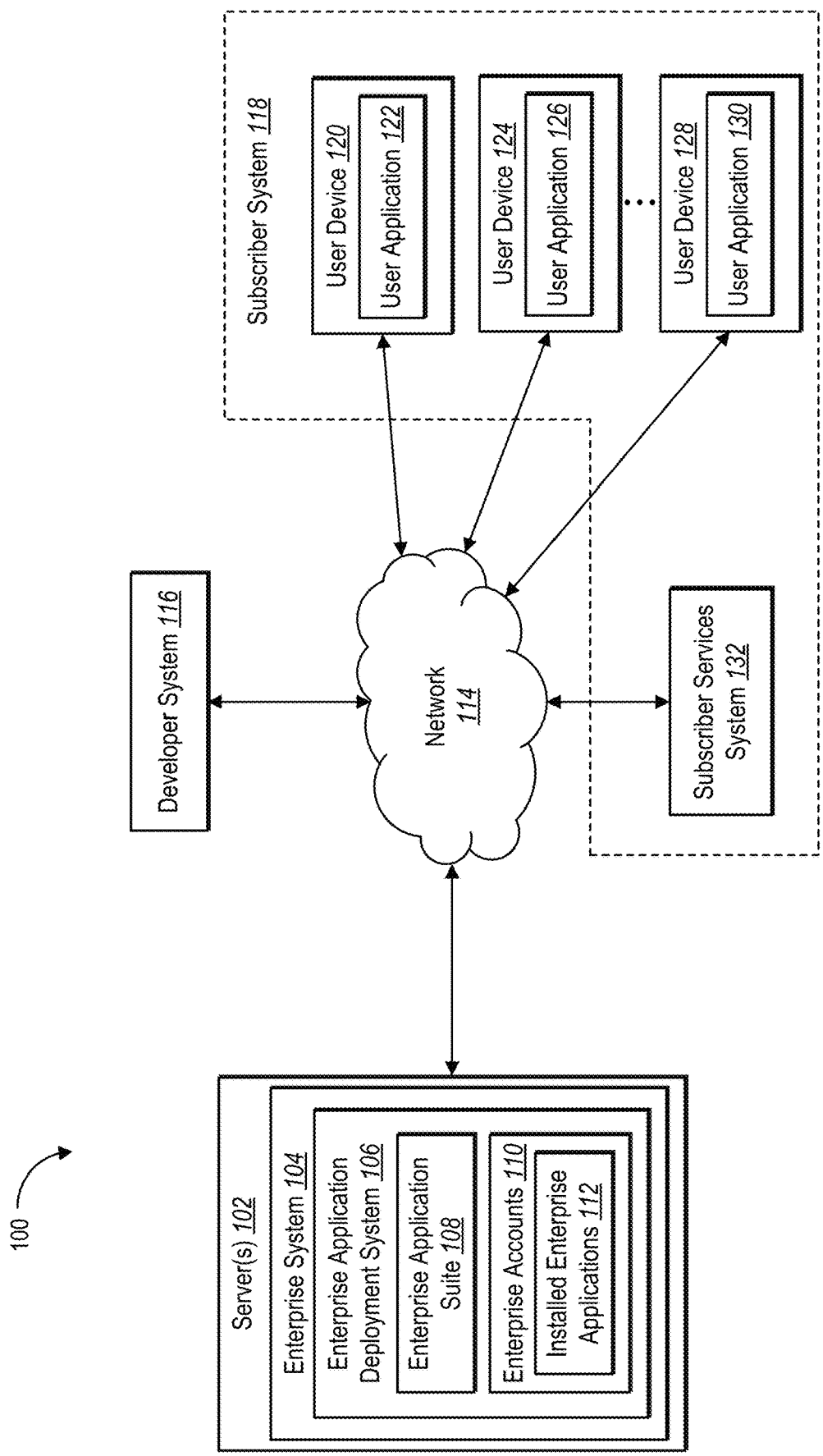
FIG. 1 illustrates an example environment for implementing an application deployment system in accordance with one or more embodiments.

This disclosure describes one or more embodiments of an enterprise application deployment system that intelligently integrates a third-party application with multiple user accounts associated with an enterprise account based on a single install request. In particular, in some embodiments, the enterprise application deployment system (hereafter "EADS") enables a user to pick a service or application from a marketplace (e.g., an application within an application suite), and follow an installation user experience to easily configure application integration to the multiple user accounts associated with the enterprise account. Accordingly, the EADS provides enterprise account managers intuitive, efficient, and quick access to fully functional, specialized tool integrations (e.g., a workforce management solution) available and running across multiple user accounts.

Additionally, the EADS can integrate an application with the enterprise account such that approved user accounts automatically have access to the application via their enterprise system user accounts without additional explicit logins. Moreover, the EADS can integrate the application with user accounts in a manner promoting secure, individualized control of application use due to data segregation and unique credentials for each access grant to the application. Further, during the same integration process, the EADS can integrate the application with the enterprise account to provide the application access to data reports and information from the enterprise system to allow the application to generate desired solutions.

As described in the present disclosure, the EADS is part of an enterprise system. The enterprise system, in general, can include a system that provides SaaS. In some example embodiments described herein, the enterprise system is a CCaaS (i.e., a call center as a service) system. Accordingly, subscribers can utilize services provided by the enterprise system and, as described in the present disclosure, can utilize specialized tools (e.g., third-party developer applications) integrated with a subscriber's enterprise account via a single install request.

To illustrate, in some embodiments, the EADS provides an enterprise application suite that includes developer uploaded applications (e.g., enterprise applications for increasing productivity and customer satisfaction along with tools available through the enterprise account). Further, the EADS may receive from an administrator device associated with the enterprise account a request to install or integrate an application from the enterprise application suite. In response to the request to install the application, the EADS can provide to the administrator device a user interface that shows a list of user accounts corresponding to the enterprise account. From the selection of user accounts received at the user interface, the EADS can associate unique credentials for each respective user account approved to receive access to the application. Thereafter, the EADS can provide access to the application on one or more devices associated with the one or more integrated user accounts.

As mentioned above, the EADS may provide an enterprise application suite with applications to an administrator device. In some embodiments, the enterprise application suite, such as the Talkdesk® AppConnect, includes a number of software applications for integrating with an enterprise system. For example, the enterprise application suite may include advanced reporting applications, agent productivity applications, dialer applications, digital channel applications, voice analytic applications, workforce management applications, workforce optimization applications, etc. Within the various categories of enterprise applications, the EADS can provide within the enterprise application suite one or more applications developed by third-parties. Accordingly, the EADS may receive a request to integrate an application from the enterprise application suite with one or more user accounts within an enterprise account, and after integration, provide the one or more user accounts with access to the application via their respective user accounts on the enterprise system.

Further, after receiving a selection of one or more user accounts to have access to the requested application, the EADS integrates the application with the user accounts by associating an application ID and authentication pair with each of the selected user accounts. The application ID and authentication pairs are unique credentials for each user account accessing the application on corresponding devices. The application ID and authentication pairs that the EADS generates allow for individualized user account access to the application. For example, the EADS may generate the application ID and authentication pairs to enable revocation of access for one user account but not other user accounts within the enterprise account. Similarly, the EADS may generate the application ID and authentication pairs to enable revocation of access for one application associated with an entire enterprise account, but not other applications associated with the enterprise account.

After application integration, the EADS manages ongoing synchronization between the developer system that created the application and the enterprise account, for example, by rolling back changes that are not approved by the developer system within a threshold sync time. For example, the EADS can perform access changes to the application based on requests from the enterprise account, which may be cancelled if the developer system does not approve the access changes within a time period of the threshold sync time.

In more detail from a developer aspect, in some embodiments, the EADS provides to a developer system one or more application programming interfaces (hereafter "APIs" or "API") compatible with the enterprise system. Given the provided APIs from the EADS, the developer system can develop an application to permit communication between the enterprise system and the developer system. For example, the EADS may generate and/or provide APIs to the developer system that will permit the developer system and/or the application to access specific data reports or data streams associated with the enterprise account from the enterprise system. Additionally or alternatively, the EADS may generate and/or provide APIs to the developer system that will permit the developer system and/or the application to deliver a data solution for use by the enterprise account on the enterprise system.

In further detail from the developer aspect, the EADS may, in some embodiments, request the developer system to subscribe to events relative to the application and/or the enterprise account. For example, during an application submission process, the EADS may send to the developer system an event selection menu that includes a number of events that the developer system can choose for notification purposes, data generation purposes, and/or approval purposes. For instance, during the onboarding process of an application, the EADS may send a list of events to the developer system for subscription in which the list includes, for example, metrics or categories relevant to an incoming call received, a call-time duration, a customer satisfaction score, a call transfer, customer escalation, etc. The developer system can then select and subscribe to various events needed for the developer application to perform its function, as will be further described below.

In view of the foregoing summary and the following description, the EADS provides many advantages and benefits over conventional systems and methods. For example, by implementing particular user interface flows and/or user experience design flows, along with APIs, the EADS can automatically integrate an enterprise account with a developer system and/or with an associated application of the developer system. Specifically, in response to a request from an administrator device associated with the enterprise account to install the application, the EADS can provide to the administrator device a selection menu of a list of user accounts corresponding to the enterprise account. Further, the EADS can associate a unique credential with each of the selected user accounts and provide access to the application on devices respectively associated with the selected user accounts. Accordingly, the EADS can forego specialized employees and/or custom created integration projects without which conventional methods and systems are unable to integrate an enterprise account with a developer system. Moreover, the EADS can reduce and/or eliminate an amount of user interactions with user interfaces for integrating the enterprise account with the developer system. Additionally, the EADS can increase system bandwidth and processing capacity for the EADS, the developer system, and/or a system corresponding to the enterprise account by reducing an amount of open work flows opened to resolve login issues that coincide with multi-logins for specialized tools and/or troubleshooting an installation process.

In addition to increased efficiency and independence of integrating the enterprise account, the EADS can automatically grant access to selected user accounts within the enterprise account based on their logins to the enterprise account and without separate logins. Specifically, by associating unique credentials with each selected user account (e.g., an application ID and authentication credential pair), the EADS can forego manual, individual software downloads of the application at each device associated with a selected user account and, instead, automatically grant access to the application via a user account login at each device of the selected user accounts. Furthermore, by automatically granting access using only a single sign-on protocol for both the user account and the application, the EADS can, in turn, increase security by decreasing password fatigue and can increase bandwidth by decreasing a number of open workflows for login issues.

Further, the EADS is a more flexible system than conventional systems. For example, conventional systems often require complicated processes for changing access privileges resulting in account outages and/or other periods of lockout for users on the enterprise account. In contrast, the EADS can easily grant or revoke access, including different levels of access, to an application on an individual user basis without affecting other users tied to the enterprise account. With higher levels of flexibility and reduced downtime for one or more users in an enterprise account, the EADS provides a distinct advantage over conventional systems.

As illustrated by the foregoing discussion, the present disclosure utilizes a variety of terms to describe features and advantages of the EADS. Additional detail is now provided regarding these and other terms used herein. For example, as used herein, the term "enterprise application suite" refers to an application store or application marketplace corresponding to an enterprise platform. In particular, the enterprise application suite includes a number of software applications for integrating with an enterprise system. For example, the enterprise application suite may include advanced reporting applications, agent productivity applications, dialer applications, digital channel applications, voice analytic applications, workforce management applications, workforce optimization applications, etc.

Further, as used herein, the term "enterprise system" refers to a system of a SaaS provider typically used by companies that have multiple users accessing the SaaS. For example, the enterprise system can include a call center (i.e., a contact center). While this application discusses various technologies with respect to a CCaaS enterprise system, this disclosure is not limited to only this example. Other examples of an enterprise system could be any computing system, a networking system, an analytics system, a deployment system, a management system, a tools system for the Internet of Things, a transaction management system, a business communication system, an expense management system, an accounting system, a productivity enhancement system, a customer relations management system, etc.

Further, as used herein, the term "developer system" refers to a computer system associated with a developer of an application that is available on the enterprise application suite. For example, a developer system is a system that can receive and use data from an enterprise system. Moreover, in some examples, the developer system can provide data and instructions to the enterprise system to cause the enterprise system to perform specific functions or generate reports. In the example where an enterprise system is a CCaaS, examples of developer systems could be advanced reporting systems, agent productivity systems, dialer systems, digital channel systems, voice analytic systems, workforce management systems, workforce optimization systems, quality assurance systems, etc.

Further as used herein, the term "application ID and authentication credential pair" refer to an identifier associated with the application and a credential that when paired together provide verification and authorization. In particular, the EADS can associate a unique application ID and authentication credential pair with a specific user account to provide a user account of the enterprise system access to the application. For example, the EADS may, for a particular workforce management application, associate a first user account with an application ID of ABC123 and an associated authentication credential of QWERTY, and a second user account with an application ID of DEF456 and an associated credential of ASDFGH. In this case, both the first user account and the second user account have independent access via the enterprise system to the workforce management application via the respective application ID and authentication credential pairs.

Further, as used herein, the terms "single sign-on" or "SSO" refer to a property of access control or access protocols permitting access based on a single login credential. In particular, an SSO access protocol in the present disclosure can allow a user account access to an application based on login credentials to the user account in the enterprise system without separate login credentials for the application.

Further, as used herein, the terms "events" or "subscribed events" refer to instances or occurrences relative to an enterprise system. In particular, in the example of a CCaaS, events can include incoming calls, call transfers, call holds, or any other suitable event that a developer system may subscribe to such that the EADS notifies/sends data to the developer system about the subscribed event. For example, a subscribed event may include an incoming call corresponding to the enterprise account, for which the developer system uses data regarding the subscribed incoming calls to generate call traffic reports for optimal enterprise staffing during certain shifts. Other examples of a subscribed event can include a new enterprise account that activates an installation or any other suitable event with respect to an enterprise account.

Further, as used herein, the term "account" refers to an arrangement in which a user is given personalized access to a computer, website, and/or application. For example, an account may include an enterprise account (e.g., a CCaaS account), a user account (e.g., an administrator account, an agent account, a supervisor account, etc. associated with an enterprise account), or any other suitable type of account.

Further, as used herein, the term "access" refers to login-entry acceptance/authorization for use of a computer, website, and/or application, including data related thereto. In particular, changes to access (e.g., access changes to access code authorizations) may occur as a result of access being granted, revoked, reinstated, etc.

Further, as used herein, the term "install" or "integrate" refers to the act of providing access. In particular, a request to install an application can include a request to provide access to the application on a user device, without necessarily including a physical installation (e.g., a download) onto hardware of the user device. For example, the user device can, through an authorized user account, access the installed application residing in a cloud-based server (e.g., a network application).

As referred to herein, the term "enterprise data" includes data relative to data of the enterprise account and/or an associated enterprise. For example, the enterprise data may include data reports, metrics, performance information, status information, etc.

As referred to herein, the "term application programming interface" or "API" refers to computer-executable instructions, definitions, communication protocols, and/or tools for creating software applications. For example, APIs may include specifications for routines, data structures, object classes, variables, and/or remote calls for integrating an enterprise account with an application and/or an associated developer system. In more detail, APIs can be application-specific, e.g., specific to a workforce management application, a workforce optimization application, a quality assurance application, a voice analytics application, etc.

Additional detail will now be provided regarding the EADS in relation to illustrative figures portraying example embodiments and implementations of the EADS. For example, FIG. 1 illustrates an environment 100 for implementing an EADS 106 in accordance with one or more embodiments. As shown in FIG. 1, the environment 100 includes server(s) 102, a network 114, a developer system 116, and a subscriber system 118. Each of the components of the environment 100 can communicate via the network 114, and the network 114 may be any suitable network over which computing devices can communicate. Example networks are discussed in more detail in relation to FIG. 15.

As mentioned, the environment 100 includes the subscriber system 118. The subscriber system 118 subscribes to one or more services provided by the enterprise system 104 through an enterprise account 110. In these or other embodiments, the subscriber system 118 includes one or more devices, such as user devices 120-128. The user devices 120-128 can be any one of a variety of computing devices, including a smartphone, tablet, smart television, desktop computer, laptop computer, virtual reality device, augmented reality device, or other computing device. Additionally, each of the user devices 120-128 may include, respectively, user applications 122-130. In these or other embodiments, the user applications 122-130 are applications for accessing respective user accounts corresponding to the enterprise account 110. In particular, the user applications 122-130 may be a web application, a native application installed on the user devices 120-128 (e.g., a mobile application, a desktop application, etc.), or a cloud-based application where part of the functionality is performed by the server(s) 102. The user applications 122-130 can present or display information to a user, including a user interface for interacting with a user account corresponding to an enterprise account 110.

In some embodiments, as indicated by the dashed box of FIG. 1, the user devices 120-128 are associated or affiliated with a subscriber services system 132. The subscriber services system 132 may be a customer support system, for example. In these embodiments, the enterprise system 104 may provide information such as an electronic communication and contacting user information to the subscriber services system 132, whereupon the subscriber services system 132 may assign or relay the electronic communication to a user device (e.g., the user device 120). In other embodiments, user devices 120-128 are not directly associated with the subscriber services system 132, and the enterprise system 104 provides information to the user devices 120-128 without utilizing the subscriber services system 132.

As mentioned, the environment 100 includes the developer system 116. The developer system 116 creates applications that an EADS 106 can automatically integrate with the enterprise accounts 110 for use by the subscriber system 118. Additionally, the developer system 116 can upload applications to an enterprise application suite 108 and/or approve requested access changes to installed enterprise applications 112 developed by the developer system 116. For example, in an example scenario in which the user device 120 sends a request to the EADS 106 to remove access to one or more of the installed enterprise applications 112 for the user device 124 (and/or an associated user account), the developer system 116 as the developer entity may approve, disapprove, or remain undecided regarding the requested access change.

As also mentioned, the environment 100 includes the server(s) 102. The server(s) 102 may generate, store, receive, and transmit electronic data, such as executable instructions, for example, to automatically integrate an application with one or more enterprise accounts 110. In one example, the server(s) 102 and/or any other system a part of or communicatively coupled to the server(s) 102 (e.g., the enterprise system 104, the EADS 106, etc.), may receive a request from the subscriber system 118 to install or integrate an application in the enterprise application suite 108. In response to the request (e.g., from an administrator device such as the user device 120), the EADS 106 may automatically integrate the developer system 116 with an enterprise account such that multiple users in the subscriber system 118 can access the application through the enterprise account 110 at the user devices 120-128. Once purchased, licensed, and/or integrated, the subscriber system 118 (including any component thereof) may access the application at the installed enterprise applications 112 as part of the enterprise account 110 that includes storage for purchased, licensed, and/or integrated applications.

Although FIG. 1 depicts the EADS 106 located on the server(s) 102, in some embodiments, the EADS 106 may be implemented by (e.g., located entirely or in part) on one or more other components of the environment 100. Thus, modifications, additions, or omissions may be made to the environment 100 without departing from the scope of the present disclosure. For example, in some embodiments, the environment 100 may include any number of other components that may not be explicitly illustrated or described. Moreover, the separation of various components in the embodiments described herein is not meant to indicate that the separation occurs in all embodiments. In addition, it may be understood with the benefit of this disclosure that the described components may be integrated together in a single component or separated into multiple components.

As an example, in some embodiments, the environment 100 may have a different arrangement of components and/or may have a different number or set of components altogether than as shown in FIG. 1. For example, the user devices 120-128, the subscriber services system 132, and/or the developer system 116 may communicate directly with the enterprise system 104, bypassing the network 114. Additionally, the enterprise system 104 can include one or more databases (e.g., a database to store contacting user information, APIs, and/or enterprise account permissions) housed on the server(s) 102 or elsewhere in the environment 100. The EADS 106 can be implemented in a variety of different ways across the server(s) 102, the network 114, the user devices 120-128, the subscriber services system 132, and/or the developer system 116. Additional and/or alternative relationships between components of the environment 100 are described in additional detail below.

Figure 2:
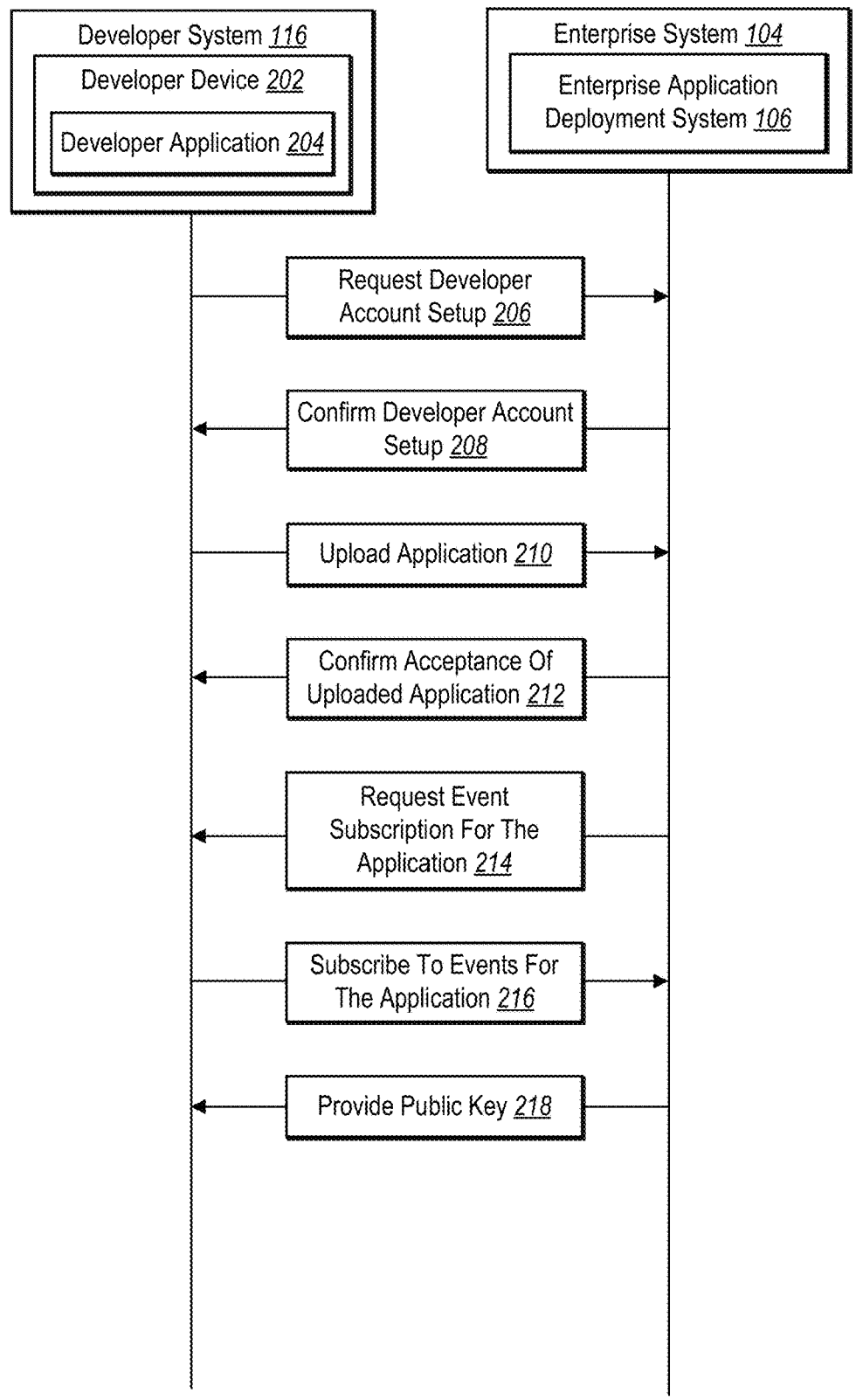
FIG. 2 illustrates an example sequence flow for uploading an application to an enterprise application suite in accordance with one or more embodiments.

As mentioned above, the EADS 106 communicates with the developer system 116 to onboard one or more applications for the enterprise application suite 108. While FIG. 2 illustrates acts according to one embodiment, alternative embodiments may omit, add to, reorder, and/or modify any of the acts shown in FIG. 2. The acts of FIG. 2 can be performed as part of a method. Alternatively, a non-transitory computer-readable medium can comprise instructions that, when executed by one or more processors, cause a computing device to perform the acts of FIG. 2. In some embodiments, a system can perform the acts of FIG. 2. Further, in these or other embodiments, any component may perform an act in ways alternative to that described in the following sections. For example, an act described as performed by the EADS 106 can, in some embodiments, be performed in whole or in part by other components of the enterprise system 104.

As illustrated, the sequence begins at act 206 when the developer system 116 requests setup of a developer account with the enterprise system 104. For example, the developer system 116 may submit to the EADS 106 general contact information, a résumé, a list of previously/currently developed applications, field(s) of expertise, development areas of interest, compliance with terms and conditions, etc. The developer system 116 may submit the request via a developer application 204 on a developer device 202. The developer device 202 can be any one of a variety of computing devices, including a smartphone, tablet, smart television, desktop computer, laptop computer, virtual reality device, augmented reality device, or other computing device.

In these or other embodiments, the developer application 204 is an application for uploading applications to the enterprise application suite 108. Further, the developer application 204 can be an application for the developer device 202 to access information regarding the developer system 116, including applications under development, launched applications, etc. Additionally, the developer application 204 can be an application for accessing one or more enterprise accounts 110, for example, to generate data solutions for the subscriber system 118. Accordingly, the developer application 204 can be a developer portal for the developer system 116 with a variety of uses and functionalities. In particular, the developer application 204 may be a web application, a native application installed on the developer device 202 (e.g., a mobile application, a desktop application, etc.), or a cloud-based application where part of the functionality is performed by a server associated with the developer system 116 and/or the server(s) 102. The developer application 204 can present or display information to a developer, including a user interface for interacting with the developer application 204 as described above.

In response to the request at act 206, the EADS 106 confirms setup of the developer account with the enterprise system 104 at act 208 by sending confirmation to the developer device 202 through the developer application 204. In some embodiments, act 208 is an automatic confirmation, for example, in response to completion of one or more forms in the request of act 206. In other embodiments, act 208 may include a decision process by which the EADS 106 may accept or decline that the developer system 116 receive a developer account as requested at act 206.

At act 210, the developer system 116 uploads, via the developer device 202 and the developer application 204, an application to the enterprise application suite 108 of the EADS 106. In these or other embodiments, the upload to the enterprise application suite 108 can be part of an automated workflow. For example, in response to initiating a request to submit an application to the enterprise application suite 108, the developer system 116 may describe the application in the upload submission, including how the application works with general application information, example user interfaces, diagrams, charts, potential use benefits, example use cases, etc. Further, in response to initiating a request to submit an application to the enterprise application suite 108, the developer system 116 may provide one or more plans (e.g., subscription plans, trial plans, etc.) and associated pricing. In this manner, the EADS 106 enables a multitude of compatible purchase models for a subscriber system 118 (e.g., per-seat licensing, flat fee plan, fixed-seat plans, and/or variable-seat plans, including with or without trial periods).

Additionally or alternatively, as part of the application upload submission, the EADS 106 may request the developer system 116 to select one or more APIs that will enable the soon-to-be-uploaded application (or the currently uploaded application) to work in conjunction with the enterprise accounts 110. Given the provided APIs from the EADS 106, the developer system 116 can enable the application to permit communication between the enterprise system 104 and the developer system 116. For example, the EADS 106 may generate and/or provide APIs to the developer system 116 for selection that will permit the developer system 116 and/or the application ready for upload to access specific data reports or data streams associated with the enterprise accounts 110. Additionally or alternatively, the EADS 106 may generate and/or provide APIs to the developer system 116 for selection that will permit the developer system 116 and/or the application ready for upload to deliver a data solution to an enterprise account 110 and/or the subscriber system 118 that uses the application.

In these or other embodiments, the EADS 106 can provide APIs in a selection menu for selecting by the developer system 116. As referred to herein, the term "selection menu" refers to a user interface for selecting menu options. In particular, the selection menu may include a user interface by way of a display screen composed of graphical components, objects, and/or elements that allow a user to select and/or deselect options within a menu. For example, the selection menu may be configured to receive user inputs that select, deselect, or otherwise provide indications of a selection/deselection of options. Examples of options may include user accounts, APIs, data reports, subscription events, etc. as described in the present disclosure.

At act 212, the EADS 106 confirms acceptance of the uploaded application at act 210. For example, the EADS 106 may send to the developer system 116 an automatic confirmation (e.g., as part of an automated application submission work flow) that the EADS 106 received the uploaded application in the enterprise application suite 108. In particular, the EADS 106 may send confirmation to the developer system 116 when the uploaded application satisfies one or more upload requirements, such as a selection of APIs that when executed with the application enable two-way communication between the EADS 106 and the developer system 116 via the uploaded application. Accordingly, prior to acceptance of the uploaded application, the EADS 106 in some embodiments can test whether the selected APIs are sufficient to enable communication and/or integration of the uploaded application with a test enterprise account. If the uploaded application satisfies the test, the EADS 106 may confirm acceptance of the uploaded application. Otherwise, the EADS 106 may deny uploading of the application to the enterprise application suite 108 and/or remove the uploaded application from the enterprise application suite 108 with an explanation to the developer system 116 (e.g., that one or more APIs should be selected and/or deselected at act 210).

At act 214, the EADS 106 requests from the developer system 116 an event subscription for the application. For example, the EADS 106 may provide to the developer system 116 a selection menu with options of various events about which the developer system 116 can indicate desired receipt of notifications, enterprise data (e.g., data reports), etc. relative to the application. In some embodiments, the EADS 106 at act 214 (or another suitable act) may request additional information from the developer system 116. For example, the EADS 106 may request a standalone uniform resource locator (hereafter "URL") that the user accounts and associated user applications (e.g., user applications 122-130) direct a user device (e.g., user devices 120-128) to in order to initiate the application created by the developer system 116. In another example, the EADS 106 may request a redirect URL that the user accounts and associated user applications (e.g., user applications 122-130) direct a user device (e.g., user devices 120-128) to after successfully identifying the user account as associated with an authorized user account of the enterprise account 110. In yet another example, the EADS 106 may request an events callback URL that the EADS 106 can use to securely deliver to the developer system 116 information regarding the developer's application and/or regarding subscribed events described at act 216.

At act 216, the developer system 116 subscribes to events for the application such that when one or more of the subscribed events occur (e.g., a call received at the enterprise system 104 that is routed to the subscriber system 118), the EADS 106 can, in response, communicate with the developer system 116 in a manner indicated by the event subscription of act 214. For example, after the developer system 116 subscribes to an event at act 216 and the event then occurs (e.g., a call is received at the enterprise system 104 that is routed to the subscriber system 118), the EADS 106 can send a notification with associated data to the developer system 116 in accordance with the event subscription described in act 214.

At act 218, the EADS 106 provides a public key to the developer system 116. In some embodiments, the public key corresponds to the developer system 116 and/or the associated developer account described in acts 208-210. In other embodiments, the public key corresponds to one or more of the enterprise accounts 110. Public keys are part of public key cryptography. As used herein, the term "public key cryptography" refers to an encryption scheme. In particular, public key cryptography includes algorithms for producing public and private keys to generate one or more portions of the application ID and authentication credential pair defined above, designate a source or destination for a communication (e.g., a developer account or one of the enterprise accounts 110), and/or promote increased data use security and higher cybersecurity standards. For example, communications between the developer system 116 and an enterprise account 110 may be encrypted using public key cryptography. Other benefits of public key cryptography include secure verification and non-repudiation of various types of events, requests, installations, etc.

Figure 3A:
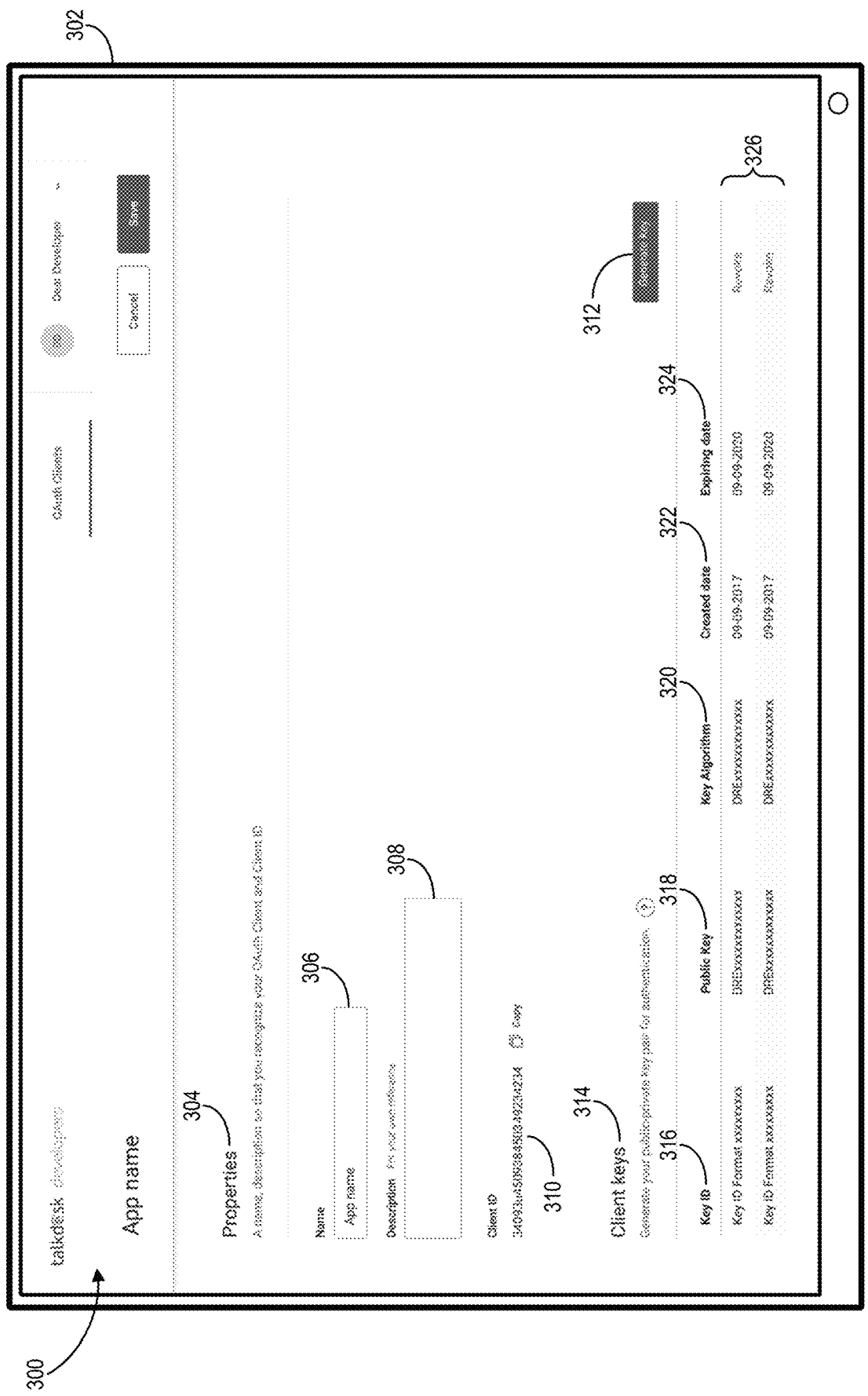
FIGS. 3A-3B illustrate an example user interface for uploading an application to an enterprise application suite in accordance with one or more embodiments.
Figure 3B:
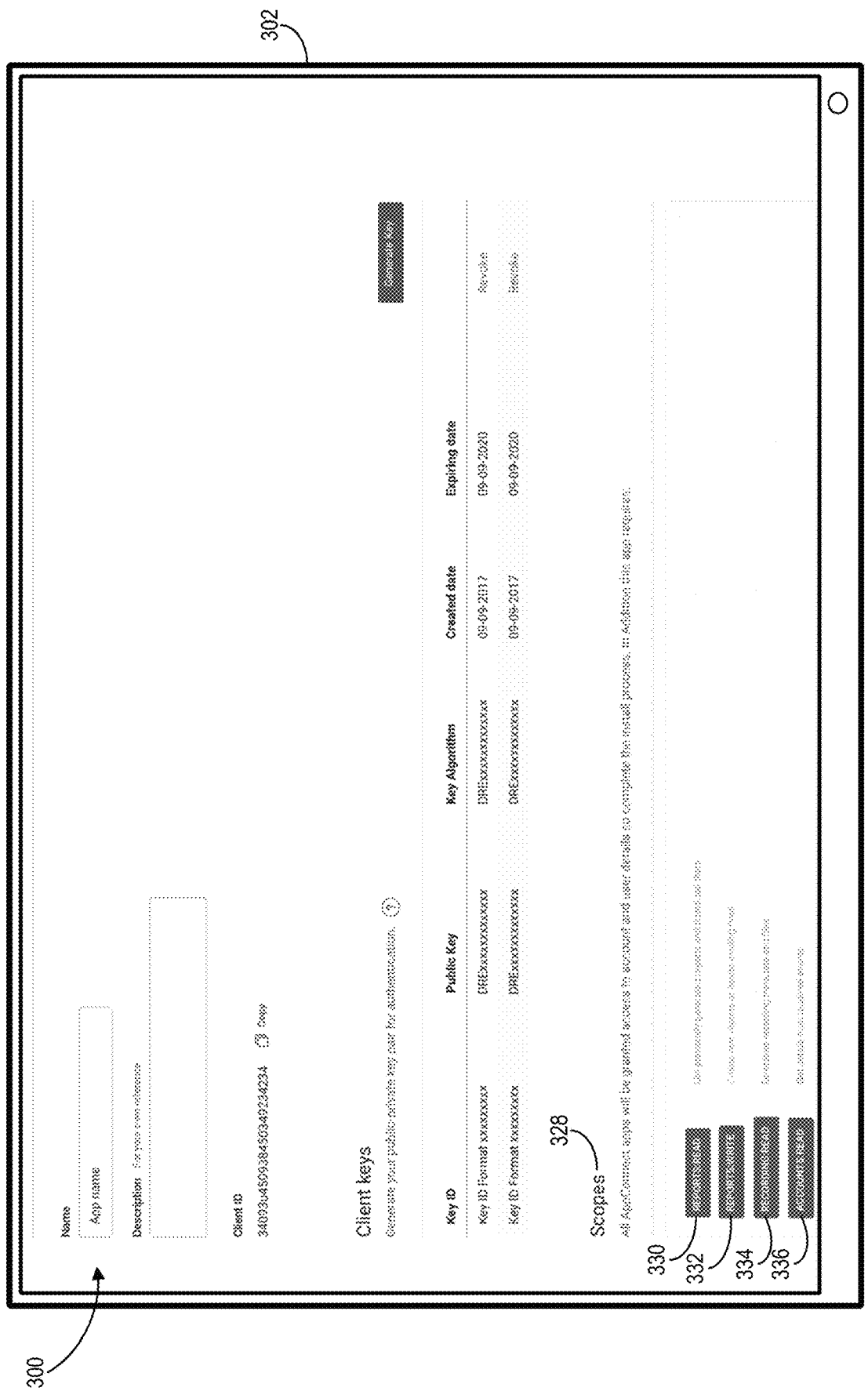

As mentioned above, the EADS 106 and the developer system 116 interact with each other to provide applications to the enterprise application suite 108. As such, FIGS. 3A-3B illustrate an example user interface 300 displayed on a developer device 302 at the developer system 116 for uploading an application to the EADS 106, arranged according to one or more embodiments of the present disclosure. The developer device 302 may be the same as or similar to the developer device 202 described above in conjunction with FIG. 2. As shown in FIGS. 3A-3B, the user interface 300 includes properties 304 and client keys 314.

In particular, the EADS 106 provides the user interface 300 with the properties 304 that includes an application name 306, a description 308, and one or more client IDs 310. The application name 306 can include an identifier of the application, a nickname, project, etc. In these or other embodiments, the application name 306 may be associated with a name of the application as shown in the enterprise application suite 108, while in other embodiments, for internal use only for the developer system 116. Further, the EADS 106 provides the user interface 300 with the description 308 that can include an overview of the application, main features of the application, a project description, manager(s) in charge of the application, or any other suitable information. Additionally, the one or more client IDs 310 can include an alphanumeric identifier (or other suitable identifier) that is unique to a particular enterprise account 110 and/or subscriber system 118.

With respect to the client keys 314, the EADS 106 provides the user interface 300 with the client keys 314 that can include a key ID 316, a public key 318, a key algorithm 320, a creation date 322, an expiration date 324, and an access change authorization 326. As shown in FIGS. 3A-3B, the client keys 314 depicted correspond to a single client ID 310, while in other embodiments, other client keys 314 can also be shown that correspond to other client IDs 310. In some embodiments, the key ID 316 includes a shortened version of the public key 318. The public key 318 is an encryption identifier particular to a given user account and/or user device. In some embodiments, the public key 318 is an identifier for the application ID and authentication credential pair described above. In particular, the developer system 116 can send an encrypted communication to a particular user device in the subscriber system 118 using the public key 318 associated with the particular user device/user account. Then, the particular user device/user account can decrypt the encrypted communication using its own secret, private key according to public-key cryptography principles. Additionally or alternatively, the EADS 106 can send an encrypted communication to the developer system 116 using the public key 318 associated with a particular user device/user account. Then, the developer system 116 can decrypt the encrypted communication using its own secret, private key according to public-key cryptography principles. In this manner, public key cryptography can enable the developer system 116 and/or the EADS 106 to verify digital signatures (e.g., to verify the data sender and confirm no data tampering or forging of various types of requests discussed in this disclosure).

Further, the key algorithm 320 is configured to produce (e.g., randomly produce) public-private key pairs including the application ID and authentication credential pairs, in which the private key is the authentication credential that corresponds to the public key (e.g., the application ID). In these or other embodiments, a button 312 can, when executed, create an application ID and authentication credential pair (e.g., public key 318 and private key pairs) using the key algorithm 320.

In some embodiments, the creation date 322 and the expiration date 324 define a time period during which each respective user account has access to the application. The creation date 322 may include the day/time access is initially granted to the user account and/or to other user accounts associated with an enterprise account 110. Further, the expiration date 324 may include the day/time access is set to end for the user account and/or other user accounts associated with enterprise account 110. In these or other embodiments, the creation date 322 and/or the expiration date 324 may be changed. For example, the access change authorization 326 may include a link that when executed causes access for the associated user account to change, for example, become revoked, reinstated, etc.

As further shown in FIG. 3B, the EADS 106 provides the user interface 300 with access scopes 328. The access scopes 328 may include access permissions that are suggested and/or required in order for the application and associated developer system 116 to generate desired data solutions. The access scopes 328 includes, for example, reports read access 330, reports write access 332, recording read access 334, and/or accounts read access 336. With the reports read access 330, the application and/or the developer system 116 may download, access and use previously generated reports. Additionally, with the reports write access 332, the application and/or the developer system 116 may create new reports or delete existing ones. Further, with the recording read access 334, the application and/or the developer system 116 may download, access, and use recording metadata and associated files. Also, with the accounts read access 336, the application and/or the developer system 116 may obtain details from events, such as the subscribed events discussed above in conjunction with FIG. 2.

Modifications, additions, or omissions may be made to the user interface 300 without departing from the scope of the present disclosure. For example, in some embodiments, the user interface 300 may include any number of other components that may not be explicitly illustrated or described. Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 4A:
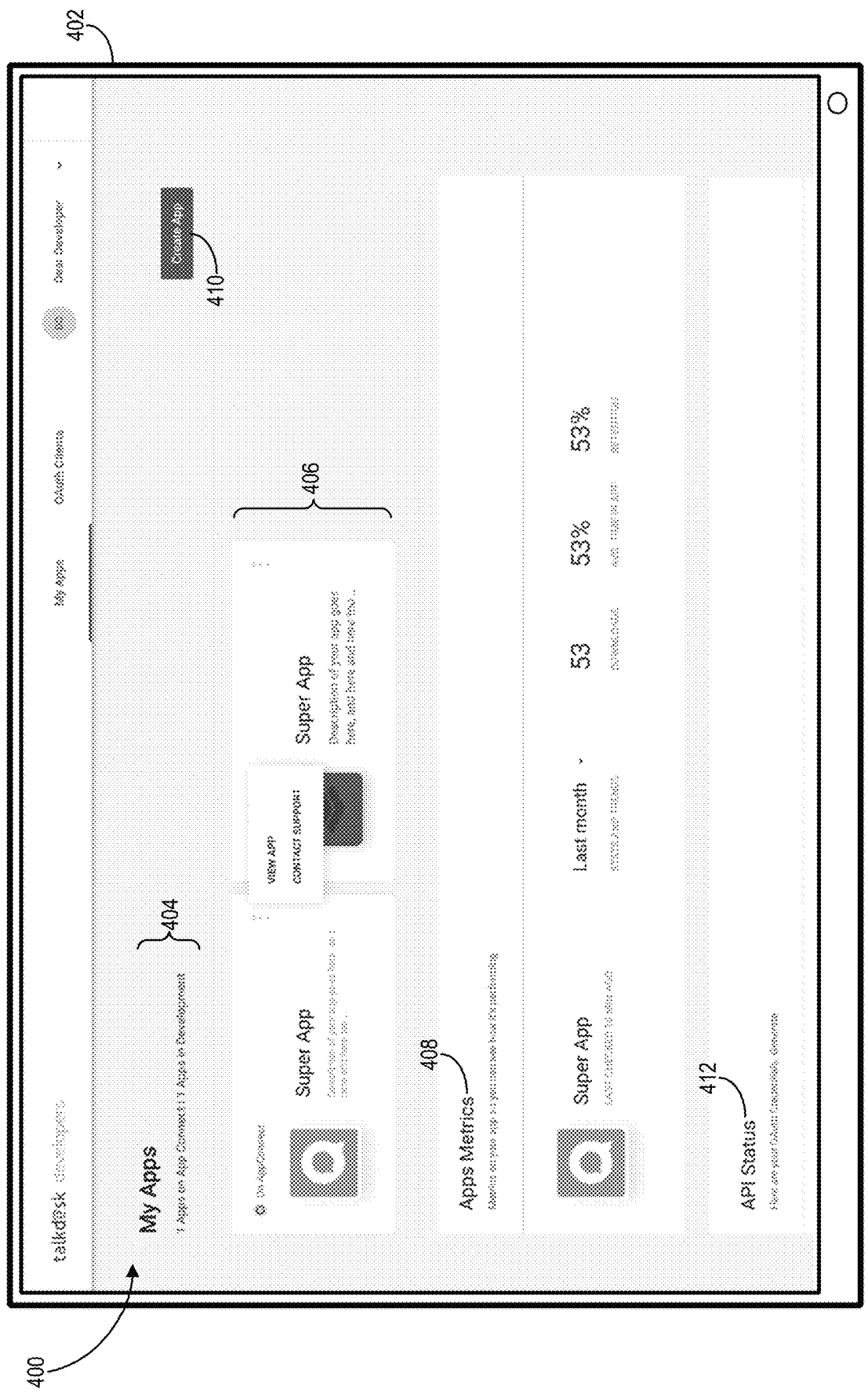
FIGS. 4A-4B illustrate an example user interface for managing an application uploaded to an enterprise application suite in accordance with one or more embodiments.
Figure 4B:
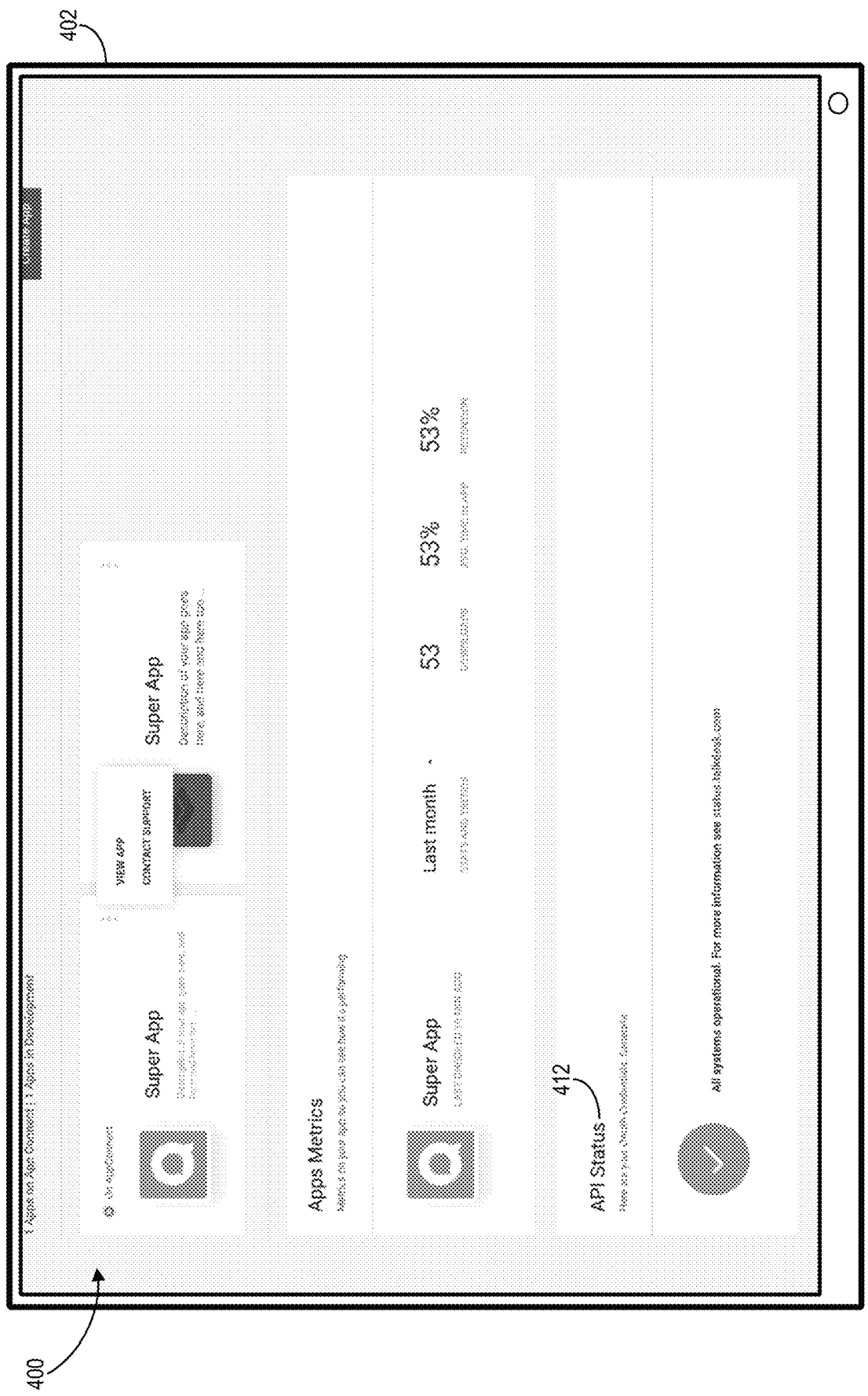

As mentioned above, the EADS 106 and the developer system 116 communicate to manage applications that are uploaded to the enterprise application suite 108. As such, FIGS. 4A-4B illustrate an example user interface 400 displayed on a developer device 402 at the developer system 116 for managing an application uploaded to the enterprise application suite 108 of the EADS 106. The developer device 402 may be the same as or similar to the developer device 202 and/or the developer device 302 described above in conjunction with FIG. 2 and FIGS. 3A-3B, respectively. As shown in FIGS. 4A-4B, the EADS 106 provides the user interface 400 with an application overview status 404, an application listing 406, application metrics 408, a button 410, and an API status 412.

In particular, the EADS 106 provides the user interface 400 with the application overview status 404 that includes a description of a current stage or development phase that the applications listed in the application listing 406 are presently located. For example, the user interface 400 depicts the application overview status 404 as showing one application on "AppConnect" (e.g., the enterprise application suite 108) and one application in "Development." Additionally, the application listing 406 may, in each listing, provide general information regarding a corresponding application.

With respect to the application metrics 408, the EADS 106 provides the user interface 400 with the application metrics 408 that includes various statistics regarding one or more applications provided in the application listing 406. For example, as shown, "Super App" has been downloaded fifty-three times, has an average time of fifty-three percent spent in the application, and has a fifty-three percent retention rate. Other suitable metrics are herein contemplated.

With respect to the button 410, the EADS 106 provides the user interface 400 with the button 410 that when executed causes the user interface 400 to initiate a new work flow for a new application, e.g., as described in FIGS. 3A-3B. Additionally or alternatively, the button 410 when executed renders a new user interface to permit new application development within the developer application 204 provided by the EADS 106 (e.g., a new window for writing code, opening a template application for editing/adding to existing code, etc.).

With respect to the API status 412, the EADS 106 provides the user interface 400 with the API status 412 that includes an operational status and/or an API status indicating to what extent the application is operational with an enterprise account 110. For example, were a bug to exist in one of the selected APIs, the EADS 106 would cause the developer device 402 to display one or more issues with an API and/or potential bug fixes for solving the issue.

Modifications, additions, or omissions may be made to the user interface 400 without departing from the scope of the present disclosure. For example, in some embodiments, the user interface 400 may include any number of other components that may not be explicitly illustrated or described. Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 5:
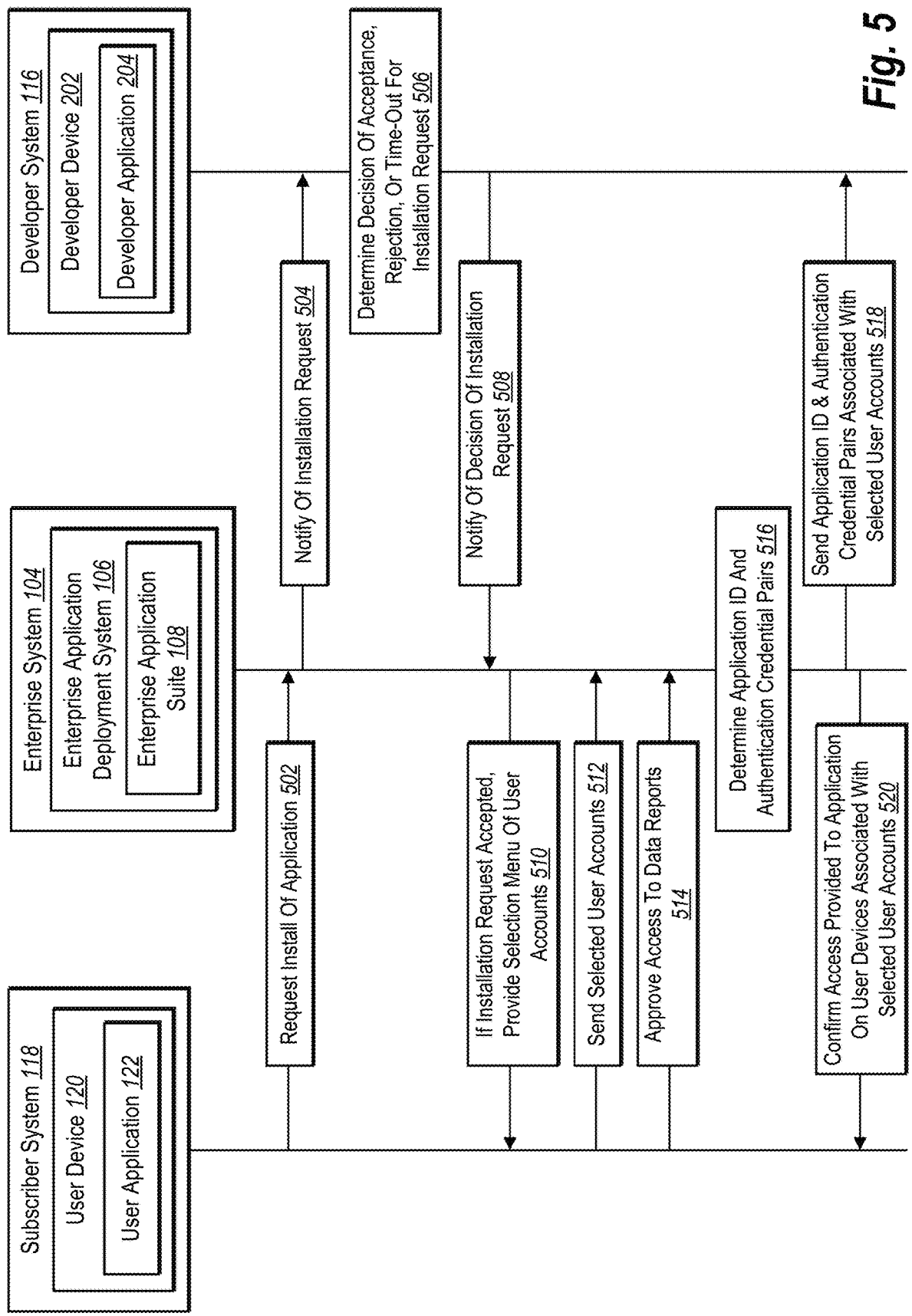
FIG. 5 illustrates an example sequence flow for integrating an application with multiple user accounts associated with an enterprise account in accordance with one or more embodiments.

As mentioned above, the subscriber system 118 subscribes to services provided by the enterprise system 104, including services provided through an application created by the developer system 116. As such, FIG. 5 illustrates a sequence flow of a series of acts performed by various components interacting with the EADS 106, arranged in accordance with at least one embodiment of the present disclosure. In particular, FIG. 5 illustrates a series of acts for providing access to multiple user accounts associated with an enterprise account 110. While FIG. 5 illustrates acts according to one embodiment, alternative embodiments may omit, add to, reorder, and/or modify any of the acts shown in FIG. 5. The acts of FIG. 5 can be performed as part of a method. Alternatively, a non-transitory computer-readable medium can comprise instructions that, when executed by one or more processors, cause a computing device to perform the acts of FIG. 5. In some embodiments, a system can perform the acts of FIG. 5. Further, in these or other embodiments, any component may perform an act in ways alternative to that described in the following sections. For example, an act described as performed by the EADS 106 can, in some embodiments, be performed in whole or in part by other components of the enterprise system 104.

Figure 6:
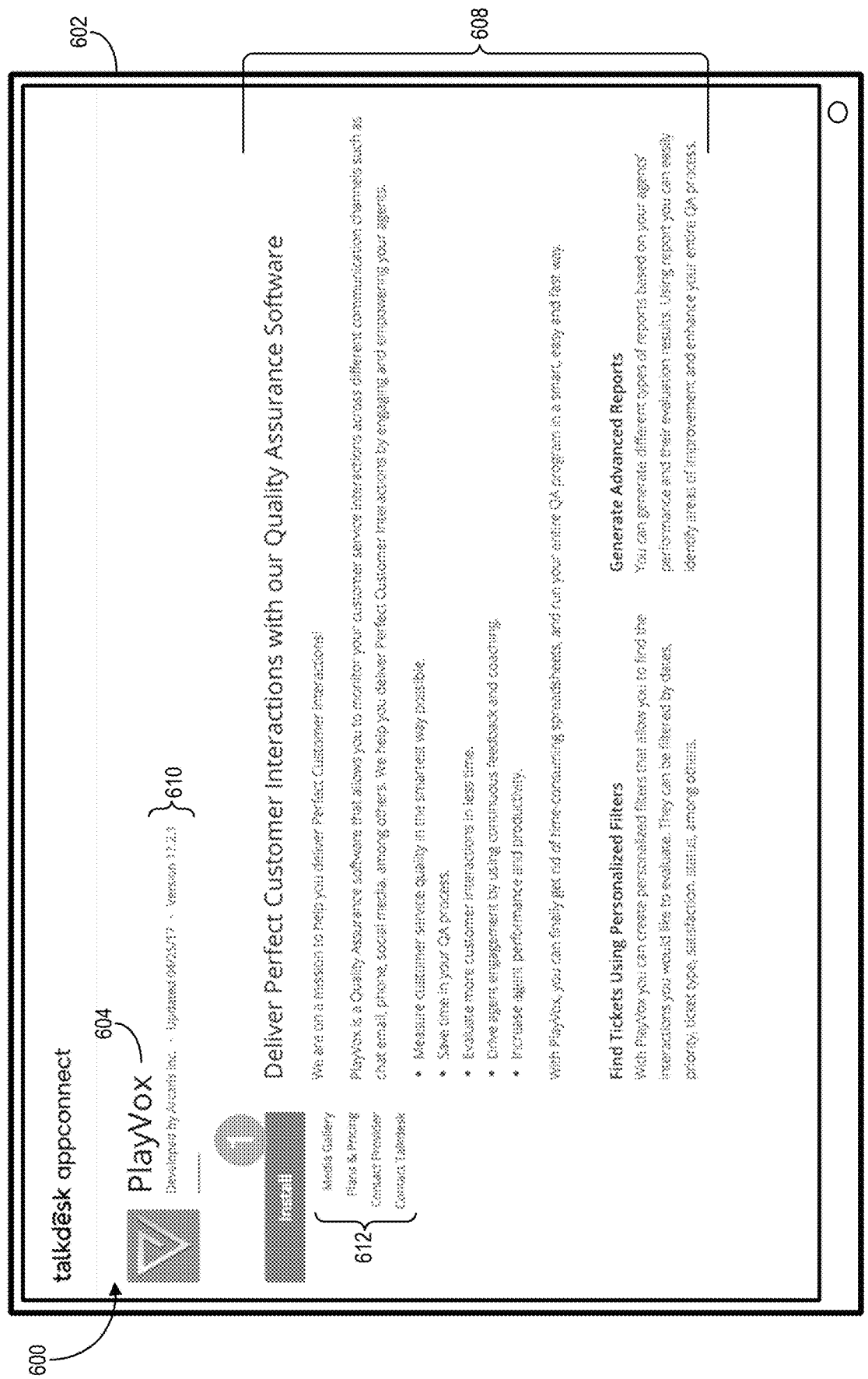
FIG. 6 illustrates an example user interface for integrating an application with multiple user accounts associated with an enterprise account in accordance with one or more embodiments.

The series of acts begins at act 502 where the EADS 106 receives a request sent from the user device 120 to install an application included in the enterprise application suite 108. In some embodiments, the user device 120 may be an administrator device. For example, a user may, through the user application 122 on the user device 120, interact with a user interface and select an application for installation by clicking on an install button (e.g., as shown in FIG. 6). Accordingly, the EADS 106 can receive from an administrator device (e.g., the user device 120) a request to install an application from among a group of applications in the enterprise application suite 108.

At act 504, the EADS 106 notifies the developer system 116 of the installation request described in act 502. In some embodiments, the EADS 106 may automatically notify the developer system 116 of the installation request (e.g., in response to the selection of the install button at the administrator device). In other embodiments, the EADS 106 may, prior to notifying the developer system 116, determine that the installation from the administrator device is legitimate and/or may require proof of authorization (e.g., an authorization code known among authorized administrators, etc.). Additionally or alternatively, the EADS 106 may retry the installation request in the event that the developer system 116 returns an error. For example, the EADS 106 may retry the installation request until receiving a successful reply from the developer system 116 or until the installation request times out.

At act 506, and based on the EADS 106 notifying the developer system 116 of the installation request, the developer system 116 determines whether to accept or reject the installation request. In some embodiments, the developer system 116 may automatically accept the installation request, except for limited circumstances (e.g., when initiating from an enterprise account having a number of user accounts satisfying some threshold number, etc.). In other embodiments, the developer system 116 may make a case-by-case determination, whether through artificial intelligence or authorized personnel.

At act 508, the EADS 106 receives from the developer system 116 a notification of the decision regarding the installation request. The decision may include explanation or reasoning from the developer system 116, while in other embodiments the notification may only include the decision of acceptance or rejection. If the EADS 106 receives an acceptance notification from the developer system 116 that approves the installation request, the series of acts can proceed to act 510. Otherwise, the EADS 106 may notify the user device 120 of alternatives and/or next steps. For example, in the case of rejection, the EADS 106 may notify the user device 120 of alternative applications that support a call center with a number of call agents that match the enterprise account.

At act 510, the EADS 106 provides a selection menu to the user device 120 in which the selection menu includes a list of user accounts associated with the enterprise account 110. In some embodiments, the selection menu may appear similar to the selection menu shown in FIG. 8, and may include various groups of user accounts and/or individual user accounts according to any sorting, filter, and/or category of user accounts.

At act 512, the EADS 106 receives a selection of user accounts selected by the user device 120. For example, the user device 120 may select one or more user accounts in the selection menu, after which the user device 120 can confirm that the selected user accounts are to receive access to the application.

Figure 9:
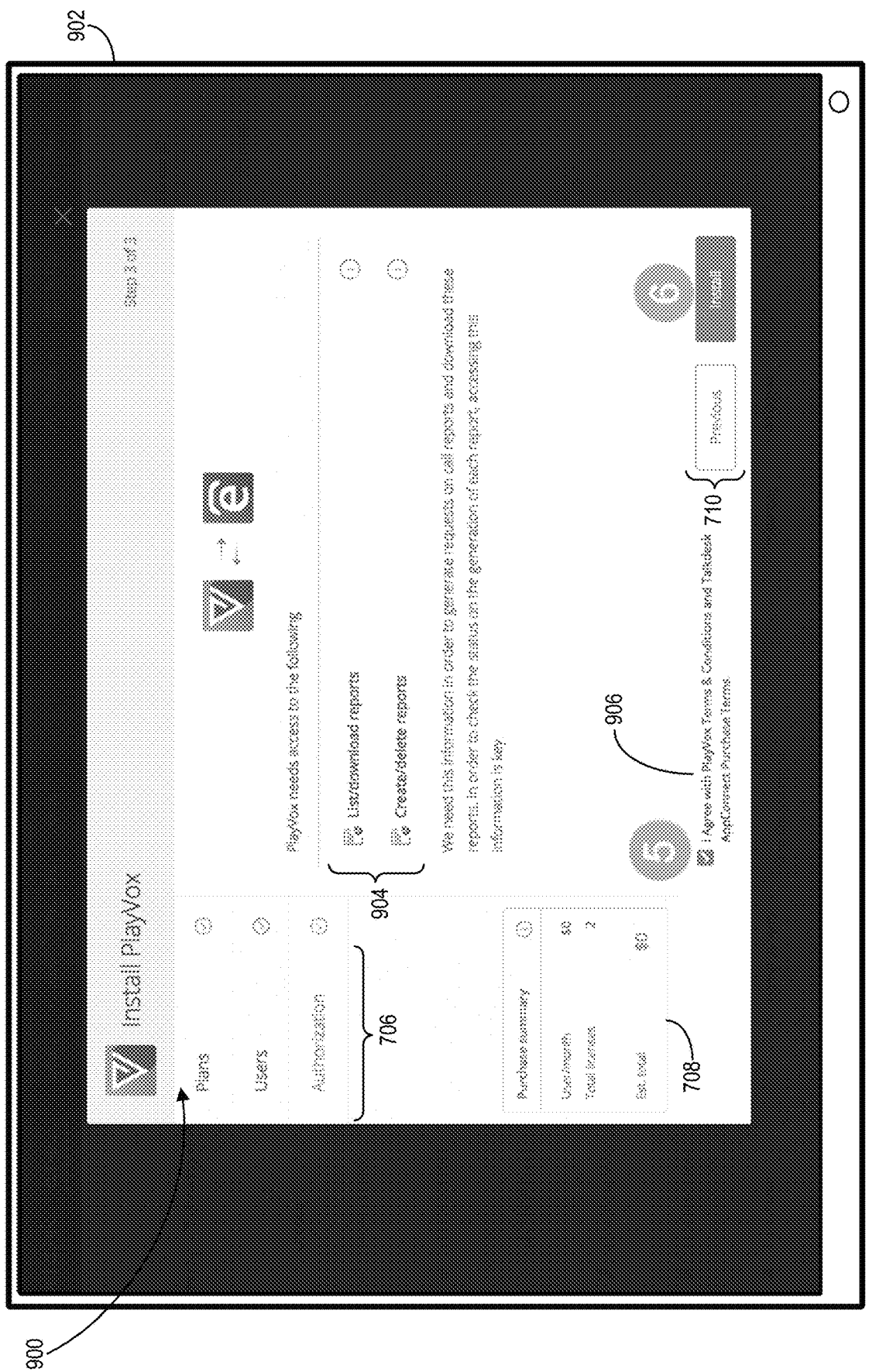
FIG. 9 illustrates another example user interface for integrating an application with multiple user accounts associated with an enterprise account in accordance with one or more embodiments.

At act 514, the EADS 106 receives access permissions from the user device 120 that approve access to one or more data reports and/or any other enterprise data associated with the enterprise accounts 110. For example, as shown in FIG. 9, the application may require access to certain data reports in order to generate a data solution. Further, and as described in conjunction with the access scopes 328 of FIG. 3B, the approved access permissions may include various types of access with different breadth and capabilities.

At act 516, the EADS 106 generates application ID and authentication credential pairs. For example, using public key cryptography, the EADS 106 can determine a unique application ID and authentication credential pair for each user account selected to receive access to the application. In some embodiments, EADS 106 may associate one or more of the application ID and authentication credential pairs based on a type of the user account within the enterprise account 110. For example, the EADS 106 may associate a first application ID and authentication credential pair with a supervisor account, and a second application ID and authentication credential pair with an agent account.

Additionally or alternatively, the EADS 106 may provide different clearance levels to certain user accounts. As used herein, the term "clearance levels" refers to degrees of access defined above. In particular, clearance levels may include different use permissions or privileges within a user account. For example, a supervisor account may include a higher clearance level than another clearance level associated with an agent account. For instance, the EADS 106 may provide a first clearance level to the supervisor account by associating the first clearance level with the first application ID and authentication credential pair. Additionally, the EADS 106 may provide a second clearance level to the agent account by associating the second clearance level with the second application ID and authentication credential pair, wherein the second clearance level provides less clearance than the first clearance level.

At act 518, the EADS 106 sends to the developer system 116 the application ID and authentication credential pairs associated with the user accounts selected at act 512. In this manner, the developer system 116 can manage access to the application on a per-user-account basis for an enterprise account 110. For example, the application ID and authentication credential pairs enable the developer system 116 to revoke access to user accounts indicating evidence of improper account usage without affecting application access for other user accounts within the enterprise account 110, and without affecting other third-party applications for the enterprise account 110. Additionally, the application ID and authentication credential pairs help to ensure that forged install requests do not occur, thereby falsely representing revenues, needed resources, etc. that might negatively affect the developer system 116.

At act 520, the EADS 106 confirms to the user device 120 that access is provided to the application on user devices associated with the selected user accounts (e.g., user devices 120-128). In this manner, the EADS 106 provides access to the application to multiple user accounts and associated user devices via a single install request from the user device 120 at act 502.

As mentioned above, the user device 120 can send an installation request for an application included in the enterprise application suite 108. To that end, FIG. 6 illustrates a user interface 600 on a user device 602 for sending an installation request to the EADS 106, arranged in accordance with at least one embodiment of the present disclosure. The user device 602 may be the same as or similar to the user devices 120-128 described above in conjunction with FIG. 1 and FIG. 5. As shown in FIG. 6, the EADS 106 provides a user interface 600 that includes an application name 604, an install button 606, information sections 608-610, and information links 612.

In particular, the EADS 106 may cause to display the application name 604 in a position, size, font, etc. to help the user identify the name of the application as the application name 604. Additionally, the EADS 106 may cause to display in the user interface 600 a logo or other graphic design to accompany a textual portion of the application name 604.

Further, the EADS 106 may cause to display the install button 606 that when executed initiates the series of acts discussed in relation to FIG. 5 to provide access to multiple user accounts on an enterprise account 110. As shown, the install button 606 may include the word "install," while in other embodiments, the install button 606 may include different words, phrases, or symbols (e.g., "purchase," "try it," "proceed to use," "access here," "productivity boost," "save $," etc.).

In addition, the EADS 106 may cause to display the user interface 600 with various types of information regarding the application in the information sections 608-610. The information sections 608-610 may include main features of the application, use benefits, product guarantees, a developer of the application, recent updates, a version of the application, or any other type of information helpful to a user in understanding more about the application. Also, the EADS 106 may cause to display the user interface 600 with the information links 612, which include additional informational resources regarding the application.

Figure 7:
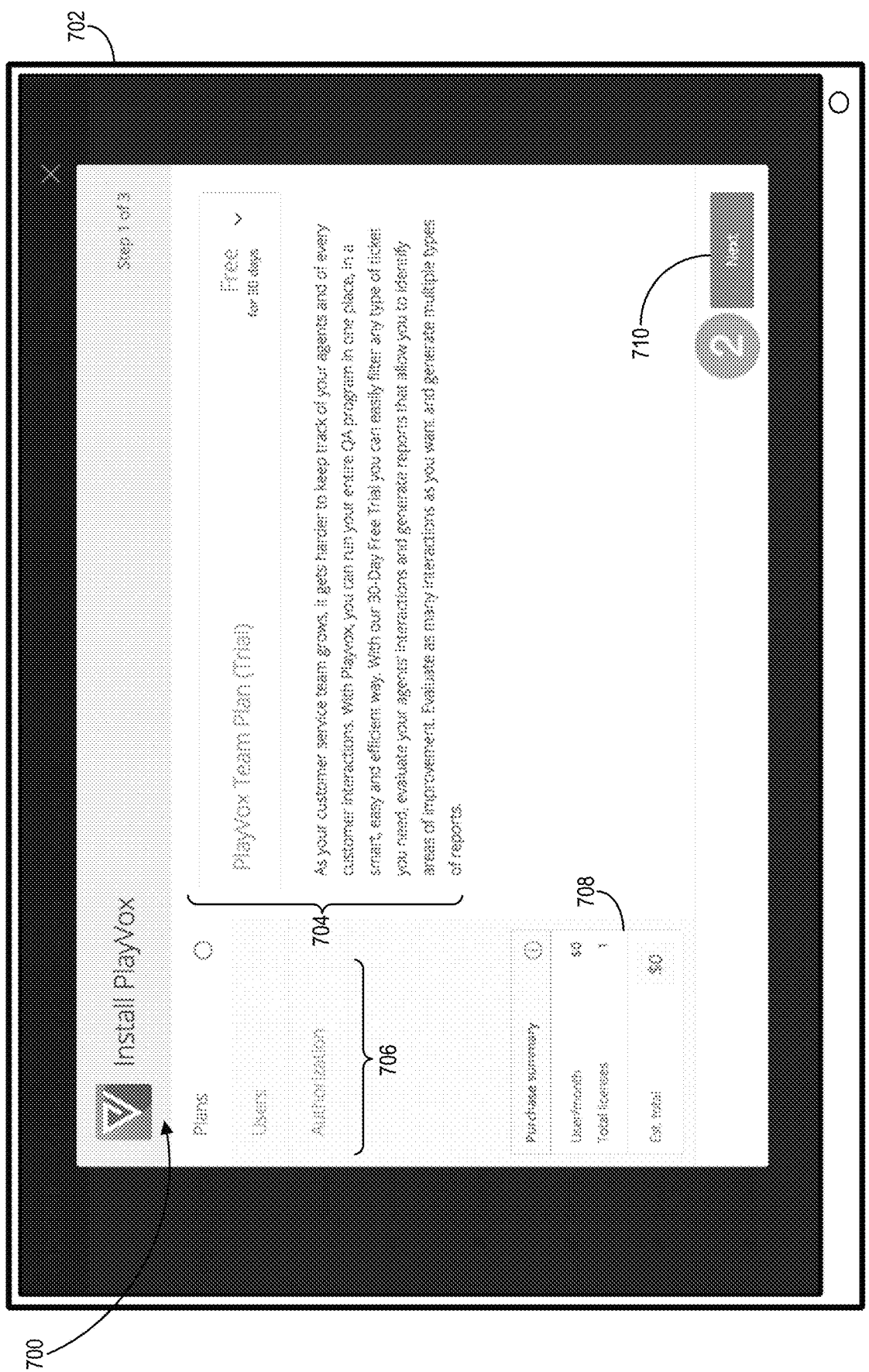
FIG. 7 illustrates another example user interface for integrating an application with multiple user accounts associated with an enterprise account in accordance with one or more embodiments.

As mentioned above, the EADS 106 may, upon receiving an install request from the user device 120, provide different plans of the application. Accordingly, FIG. 7 illustrates a user interface 700 displayed on a device 702 for selecting an enterprise plan, arranged in accordance with at least one embodiment of the present disclosure. The user device 702 may be the same as or similar to the user devices 120-128 and user device 602 described above in conjunction with FIG. 1 and FIG. 6, respectively. As shown in FIG. 7, the user interface 700 includes an enterprise plan selection menu 704, a navigation pane 706, a shopping cart 708, and one or more navigation buttons 710.

In particular, the EADS 106 causes the user device 702 to display the user interface 700 with the enterprise plan selection menu 704 including a drop-down menu, a list, or other presentation of enterprise plan options. In this manner, the EADS 106 can receive user inputs to select an option within the enterprise plan selection menu 704. As depicted in FIG. 7, the enterprise plan selection menu 704 includes a free trial plan that extends in this case for a trial period of thirty days. Should the user select the free trial plan indicated in the enterprise plan selection menu 704, the EADS 106 would initiate the series of acts described in relation to FIG. 5. At the end of the trial period, the EADS 106 can determine if the trial should be extended. If yes, the EADS 106 may choose to extend the trial period accordingly. If not, the EADS 106 may request the subscriber system 118 to upgrade to a paid enterprise plan, or otherwise deny the subscriber system 118 further access to the application under the free trial plan. The EADS 106 may outline these and other example scenarios in an overview of the free trial plan indicated in the enterprise plan selection menu 704.

As further shown in FIG. 7, the EADS 106 causes the user device 702 to display the navigation pane 706 with various steps a user undergoes after initiating the install request for providing access to the application to multiple user accounts within an enterprise account 110. In addition, the navigation pane 706 can indicate to a user a current step within a group of steps for achieving access to the application for multiple user accounts within an enterprise account 110. As the user proceeds through the steps outlined in the navigation pane 706, the EADS 106 can update the shopping cart 708 to reflect user-selected options (e.g., according to the selected enterprise plan, number of licenses, etc.). Further, the EADS 106 causes the user device 702 to display the navigation button 710 that when executed moves the user forwards or backwards with respect to the steps outlined in the navigation pane 706.

Figure 8:
FIG. 8 illustrates another example user interface for integrating an application with multiple user accounts associated with an enterprise account in accordance with one or more embodiments.

As mentioned above, the EADS 106 enables the user device 120 to select which user accounts within the enterprise account 110 are to receive access to the application. As such, FIG. 8 illustrates a user interface 800 on a user device 802 for selecting user accounts to receive access to the application in response to an install request from the user device 120, all arranged according to one or more embodiments of the present disclosure. The user device 802 may be the same as or similar to the user devices 120-128 and user devices 602, 702 described above in conjunction with FIG. 1, FIG. 6, and FIG. 7, respectively. As shown in FIG. 8, the user interface 800 includes the navigation pane 706, the shopping cart 708, and the navigation button 710 described above in addition a user account selection menu 804 and a search bar 806.

In particular, the EADS 106 causes the user device 802 to display the user interface 800 with the user account selection menu 804 that includes various user accounts (e.g., individual user accounts, groups of user accounts, departments of user accounts, clearance levels of user accounts, etc.). Further, the EADS 106 can receive user inputs to select one or more user accounts within the enterprise account 110 to receive access to the application. Additionally, the EADS 106 can return search results in the form of user accounts in response to user inputs (e.g., search queries) at the search bar 806. After the user selects which user accounts are to receive access to the application, the EADS 106 can update the shopping cart 708 and proceed to the next step outlined in the navigation pane 706 in response to a user input at the navigation button 710 of "Next."

As mentioned above, the EADS 106 provides the developer system 116 access to enterprise data of the enterprise account 110 so that the developer system 116 can generate data solutions based on the provided enterprise data. As such, FIG. 9 illustrates a user interface 900 on a user device 902 for granting authorization for the developer system 116 to access enterprise data, arranged according to one or more embodiments of the present disclosure. The user device 902 may be the same as or similar to the user devices 120-128 and user devices 602, 702, 802 described above in conjunction with FIG. 1, FIG. 6, FIG. 7, and FIG. 8, respectively. As shown in FIG. 9, the user interface 900 includes the navigation pane 706, the shopping cart 708, and the navigation button 710 described above in addition to data reports 904 and terms and conditions 906.

In particular, the EADS 106 causes the user device 902 to display the user interface 900 with the data reports 904 that includes a list of suggested and/or required enterprise data sets that the developer system 116 uses to create data solutions. The EADS 106 may require the data reports 904 to be uploaded to the user interface 900, while in other embodiments the EADS 106 subsequently delivers the data reports 904 to the developer system 116 and/or permits the developer system 116 to access the data reports 904 on the server(s) 102 within the enterprise account 110. Further, the EADS 106 causes the user device 902 to display the user interface 900 with the terms and conditions 906 to ensure that the subscriber system 118 agrees to honor the terms and conditions of both the developer system 116 and the enterprise system 104. With agreement to the terms and conditions 906 (e.g., satisfied by a user input confirming agreement), the EADS 106 may update the shopping cart 708 and proceed to providing access to the selected user accounts once the EADS 106 receives another user input at the navigation button 710 of "Install."

Modifications, additions, or omissions may be made to the user interfaces 600-900 of FIGS. 6-9 without departing from the scope of the present disclosure. For example, in some embodiments, any of the user interfaces 600-900 may include any number of other components that may not be explicitly illustrated or described. Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 10B:
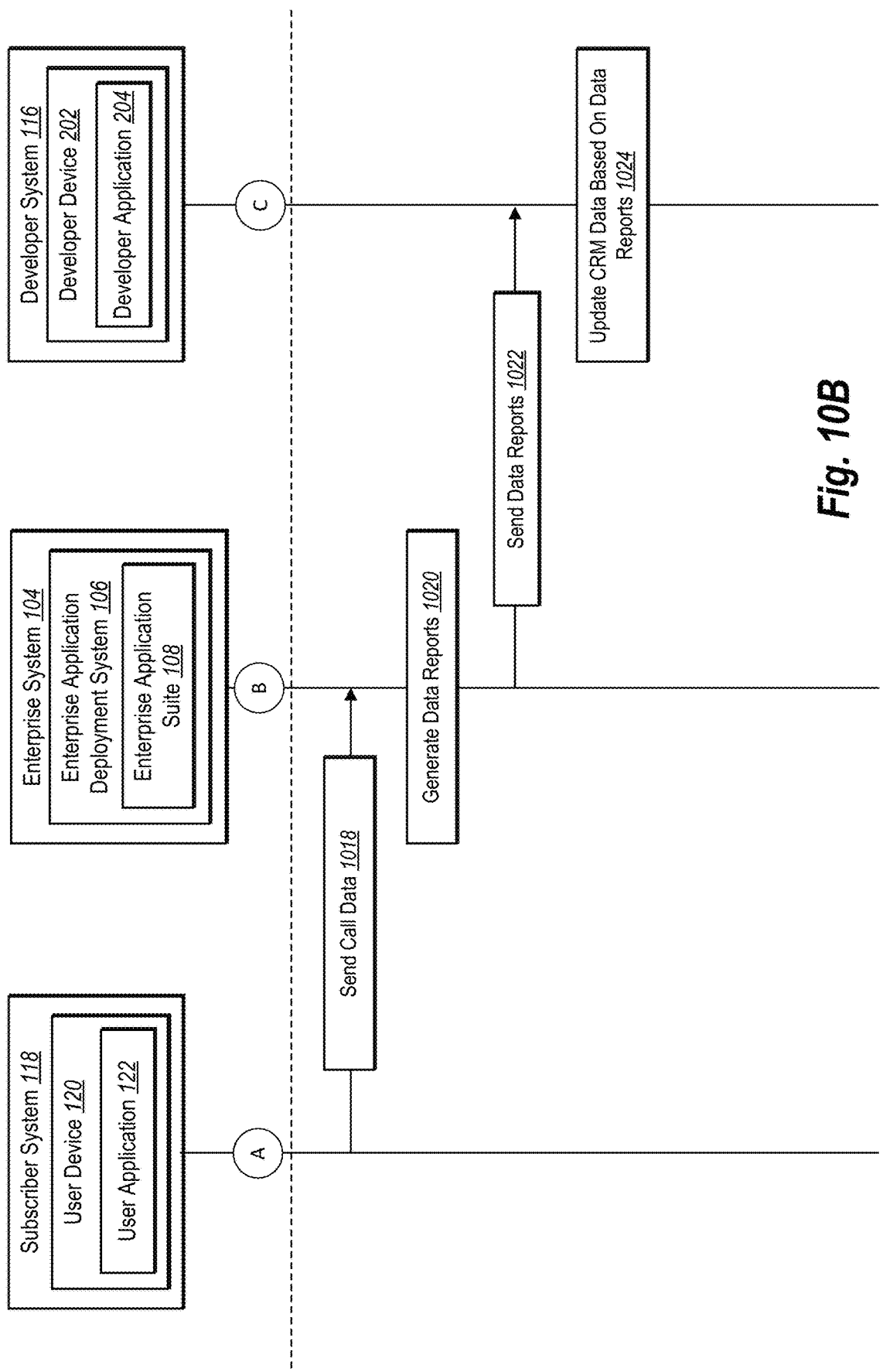

As mentioned above, the developer system 116 generates data solutions for the subscriber system 118 and the EADS 106 provides enterprise services for the subscriber system 118. As such, FIGS. 10A-10B illustrate a sequence flow of a series of acts performed by various components interacting with the EADS 106, arranged in accordance with at least one embodiment of the present disclosure. In particular, FIGS. 10A-10B illustrate example interactions between various components in response to the occurrence of a subscribed event, which in this case is a received call at the enterprise system 104. While FIGS. 10A-10B illustrate acts according to one embodiment, alternative embodiments may omit, add to, reorder, and/or modify any of the acts shown in FIGS. 10A-10B. The acts of FIGS. 10A-10B can be performed as part of a method. Alternatively, a non-transitory computer-readable medium can comprise instructions that, when executed by one or more processors, cause a computing device to perform the acts of FIGS. 10A-10B. In some embodiments, a system can perform the acts of FIGS. 10A-10B. Further, in these or other embodiments, any component may perform an act in ways alternative to that described in the following sections. For example, an act described as performed by the EADS 106 can, in some embodiments, be performed in whole or in part by other components of the enterprise system 104.

The series of acts begins at act 1002 where the EADS 106 receives login credentials from the user device 120 through the user application 122 to access the user account associated with the enterprise account 110. At act 1004, the EADS 106 accepts the login credentials from the user device 120. At act 1006, a subscribed event occurs in which the enterprise system 104 receives a call (e.g., from a customer or client).

At act 1008, the enterprise system 104 routes the call to the user device 120 of the subscriber system 118 in accordance with the enterprise-subscriber arrangement between the subscriber system 118 and the enterprise system 104. However, since the subscriber system 118 also receives services (e.g., data solutions) from the developer system 116 through the installed application from the enterprise application suite 108 (as described in relation to FIGS. 5-9), the EADS 106 at act 1010 notifies the developer system 116 of the subscribed event and in this case requests customer relationship management (hereafter "CRM") data from the developer system 116.

At act 1012, the developer system 116 sends the CRM data (e.g., as requested or instructed by the EADS 106) to the user device 120 via the installed application accessed through the user account associated with the enterprise account 110. At act 1014, the EADS 106 causes the user device 120 to display the CRM data via the user account associated with the enterprise account 110. Specifically, the user device 120 displays the CRM data generated by the developer system 116 through the user application 122 of the enterprise account 110 without needing to separately login to the installed application. Additionally or alternatively, the user device 120 may display at least some portions of the CRM data via the user application 122 sent from the EADS 106 instead of the developer system 116 (e.g., in a separate window but without additional logins). At act 1016, the user device 120 and/or the customer ends the call. In these or other embodiments, the call ending is another subscribed event from which the EADS 106 generates data and/or the developer system 116 provides data solutions.

As a result of the call ending at act 1016, the EADS 106 receives call data sent from the subscriber system 118 at act 1018. The call data may include any data associated with the call, including any resulting data obtained about the customer, a product, payment information, etc. Additionally or alternatively, the call data may include any data associated with handling the call, e.g., a call wait time, a number of transfers, voice analytics, customer satisfaction, efficiency, a call duration, etc. Based on the call data received at the EADS 106, the EADS 106 generates data reports at act 1020. The data reports may include any aspect of the call data and/or any data derivative therefrom. Examples of data reports include the data reports 904 shown in FIG. 9. Additionally or alternatively, the data reports may include any type of file (e.g., .csv, .xlsx, .pdf, .docx, etc.).

At act 1022, the EADS 106 sends the data reports to the developer system 116. The EADS 106 may send the data reports to the developer system 116 on a continual, rolling basis (e.g., as EADS 106 completes them) and/or on a batch basis with multiple data reports (e.g., at regular intervals). Additionally or alternatively, the EADS 106 can enable and/or provide various types of permissions to the developer system 116 to access the data reports at the EADS 106 (e.g., via one or more APIs). At act 1024, the developer system 116 updates the CRM data based on the data reports sent from the EADS 106. For example, the developer system 116 may update the CRM data as instructed by the EADS 106 to provide current information to the subscriber system 118 in response to the next subscribed event.

Figure 11:
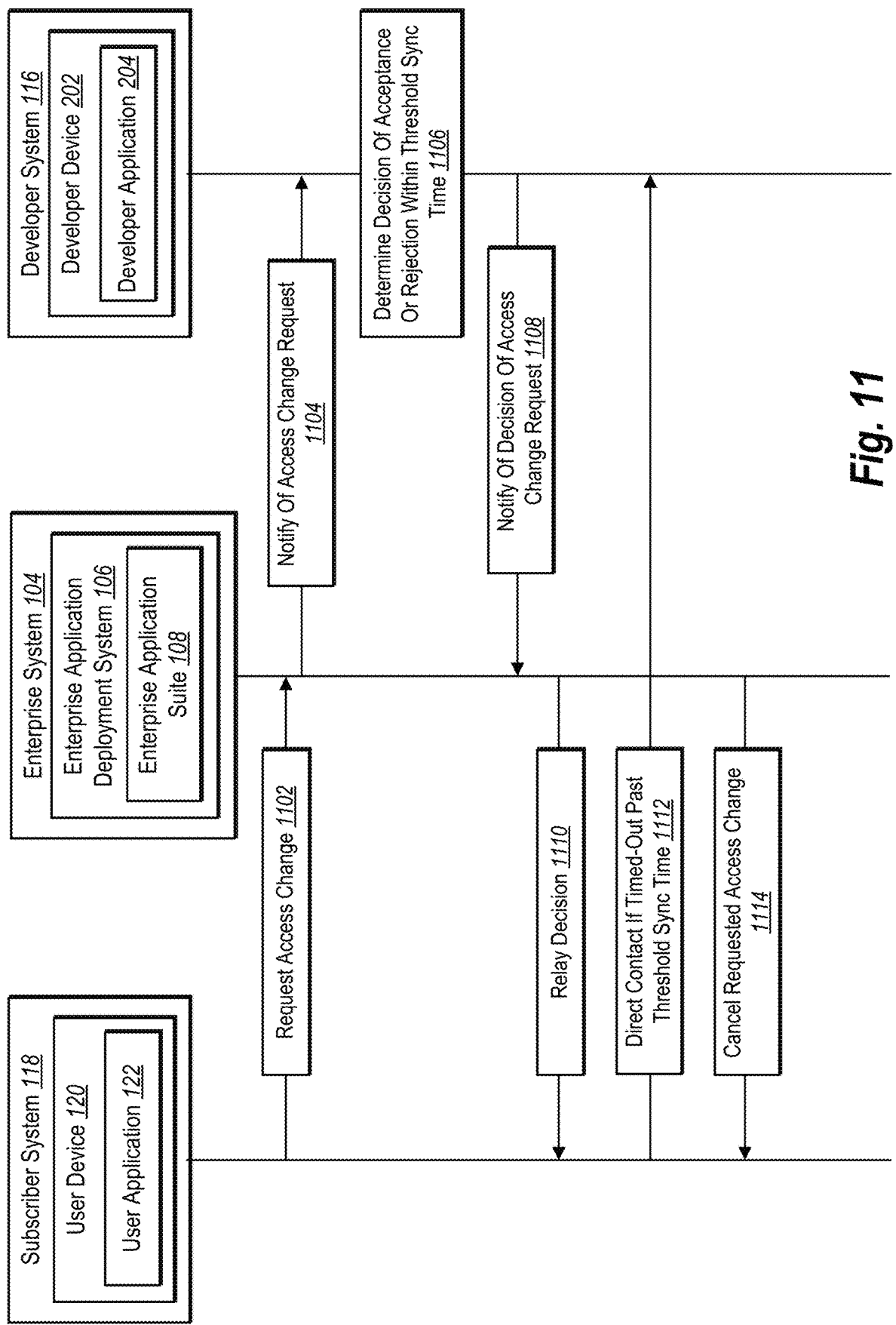
FIG. 11 illustrates an example sequence flow for requesting a modification to a user account associated with an enterprise account in accordance with one or more embodiments.

As mentioned above, the subscriber system 118 can request access changes for one or more user accounts within the enterprise account 110 in such a way as to not affect other user accounts. As such, FIG. 11 illustrates a sequence flow of a series of acts performed by various components interacting with the EADS 106, arranged in accordance with at least one embodiment of the present disclosure. In particular, FIG. 11 illustrates a series of acts for handling access changes for user accounts in a manner that syncs the developer system 116 with the EADS 106. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11. Further, in these or other embodiments, any component may perform an act in ways alternative to that described in the following sections. For example, an act described as performed by the EADS 106 can, in some embodiments, be performed in whole or in part by other components of the enterprise system 104.

As illustrated, the series of acts begins at act 1102 where the EADS 106 receives from the subscriber system 118 a request for an access change to a user account associated with the enterprise account 110. For example, an admin device (e.g., the user device 120) may send a communication to the EADS 106 requesting that the EADS 106 remove access to the application from a user device (e.g., the user device 124). In this example scenario, the admin wishes to remove access to the application associated with one user account on the user device 124 and leave all other user accounts with their respective accesses to the application intact. In response to the request, the EADS 106 notifies the developer system 116 of the access change request at act 1104.

At act 1106, the developer system 116 determines within a threshold sync time whether to accept or reject the access change request based on the notification from the EADS 106 at act 1104. As used herein, the term "threshold sync time" refers to a period of time. In particular, the threshold sync time can define an amount of time for which access changes can be approved, disapproved, reviewed, remain pending, etc. For example, the threshold sync time may include a time limit, an expiration, a closing time, etc. In some embodiments, the developer system 116 may automatically accept the access change request, except for limited circumstances (e.g., when lowering a clearance level, raising a clearance level beyond multiple clearance levels, entirely removing access, etc.). In other embodiments, the developer system 116 may make a case-by-case determination, whether through artificial intelligence or authorized personnel.

At act 1108, the EADS 106 receives from the developer system 116 a notification of the decision regarding the access change request. The decision may include explanation or reasoning from the developer system 116, (e.g., explanation with alternative access changes that are acceptable according to policies of the subscriber system 118, the enterprise system 104, and/or the developer system 116) while in other embodiments only the decision of acceptance or rejection.

At act 1110, the EADS 106 relays the decision of the access change request to the subscriber system 118. If the developer system 116 accepts the access change request, the series of acts illustrated in FIG. 11 end. Similarly, if the developer system 116 rejects the access change request, the series of acts illustrated in FIG. 11 end. However, the series of acts can proceed to acts 1112 and/or 1114 if the developer system 116 fails to determine within the threshold sync time whether to accept or reject the access change request.

At act 1112, the EADS 106 enables direct contact between the subscriber system 118 and the developer system 116 if the decision of act 1106 does not occur within the threshold sync time. For example, the EADS 106 may inform the subscriber system 118 of a direct connection (e.g., telephone line) to contact the developer system 116 directly to find out additional information and/or request that the access change request be granted (e.g., synced with the developer system 116).

At act 1114, the EADS 106 cancels the requested access change if the decision of act 1106 does not occur within the threshold sync time. In this manner, the EADS 106 helps to ensure that the developer system 116 is synced with the EADS 106 and that no access discrepancies exist between the enterprise system 104, the developer system 116, and/or the subscriber system 118. In some embodiments, the EADS 106 may perform act 1114 automatically at the end of the threshold sync time, while in other embodiments, after a grace period.

In other embodiments, act 1114 may be modified. For example, at the end of the threshold sync time, the EADS 106 may approve the requested access change on behalf of the developer system 116 and/or force sync with the developer system 116 such that the developer system 116 is updated to reflect the new access change. Other alternatives are herein contemplated.

Figure 12:
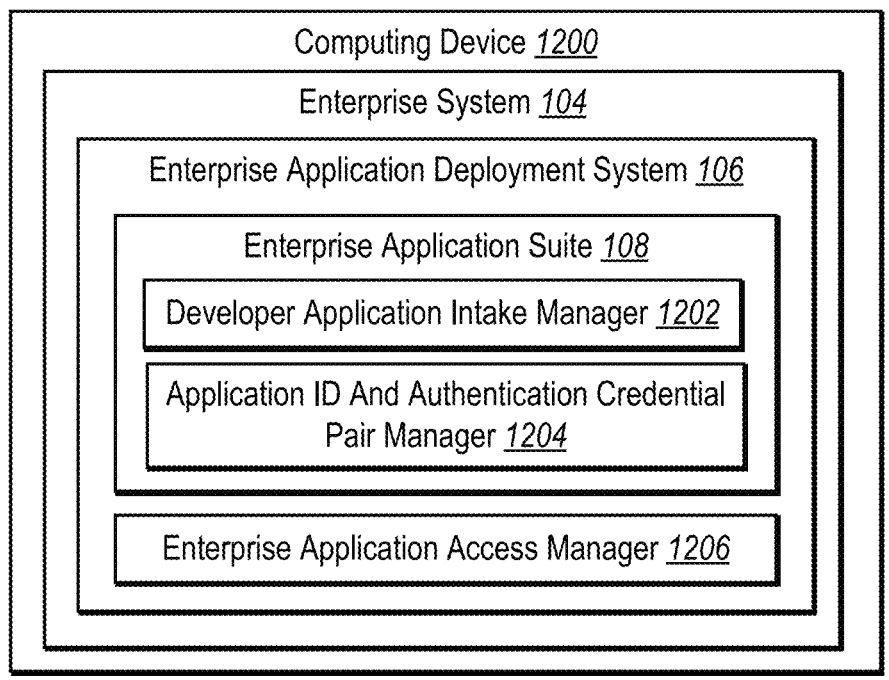
FIG. 12 illustrates a schematic diagram of an enterprise application deployment system in accordance with one or more embodiments.

Turning now to FIG. 12, additional detail will be provided regarding components and capabilities of the EADS 106 part of the enterprise system 104. Specifically, FIG. 12 illustrates an example schematic diagram of the EADS 106 on an example computing device 1200 (e.g., the server(s) 102). As shown in FIG. 12, the EADS 106 of the enterprise system 104 includes the enterprise application suite 108, a developer application intake manager 1202, an application ID and authentication credential pair manager 1204, and an enterprise application access manager 1206.

As just mentioned, the user device 1200 includes the developer application intake manager 1202. The developer application intake manager 1202 manages the intake of applications created by developers for submission to the enterprise application suite 108. For example, the developer application intake manager 1202 manages, obtains, gathers, collects, identifies, determines, or requests data with respect to developer systems 116 and/or information regarding an application ready for upload to the enterprise application suite 108. Additionally or alternatively, for example, the developer application intake manager 1202 handles application queries from the developer system 116, requests the developer system 116 to select and use APIs that render the application compatible with enterprise accounts 110, and/or collects one or more uniform resource locators (URLs) from the developer system 116 for secure communication flows. Based on the application intake, the developer application intake manager 1202 can upload or otherwise populate the enterprise application suite 108 as described above so as to include the application.

As also mentioned, the EADS 106 includes the application ID and authentication credential pair manager 1204. The application ID and authentication credential pair manager 1204 manages, generates, obtains, stores, sends, and/or receives application ID and authentication credential pairs. For example, using public key cryptography, the application ID and authentication credential pair manager 1204 can generate unique application ID and authentication credential pairs for each user account associated with an enterprise account as described above.

As further mentioned, the EADS 106 includes the enterprise application access manager 1206. The enterprise application access manager 1206 manages, provides, requests, approves, accepts, rejects, denies, and/or verifies user account access to installed applications. Additionally or alternatively, the enterprise application access manager 1206 handles access change requests in a manner that enables the EADS 106, the subscriber system 118, and/or the subscriber system 118 to be in sync with each other, for example, using a threshold sync time in which access changes can be approved or rejected as described above.

In one or more embodiments, each of the components of the EADS 106 are in communication with one another using any suitable communication technologies. Additionally, the components of the EADS 106 can be in communication with one or more other devices including one or more client devices described above. It will be recognized that although the components of the EADS 106 are shown to be separate in FIG. 12, any of the subcomponents may be combined into fewer components, such as into a single component, or divided into more components as may serve a particular implementation. Furthermore, although the components of FIG. 12 are described in connection with the EADS 106, at least some of the components for performing operations in conjunction with the EADS 106 described herein may be implemented on other devices within the environment (e.g., the environment 100 of FIG. 1).

The components of the EADS 106 can include software, hardware, or both. For example, the components of the EADS 106 can include one or more instructions stored on a computer-readable storage medium and executable by processors of one or more computing devices (e.g., the computing device 1200). When executed by the one or more processors, the computer-executable instructions of the EADS 106 can cause the computing device 1200 to perform the methods described herein. Alternatively, the components of the EADS 106 can comprise hardware, such as a special purpose processing device to perform a certain function or group of functions. Additionally or alternatively, the components of the EADS 106 can include a combination of computer-executable instructions and hardware.

Furthermore, the components of the EADS 106 performing the functions described herein may, for example, be implemented as part of a stand-alone application, as a module of an application, as a plug-in for applications including enterprise deployment applications, as a library function or functions that may be called by other applications, and/or as a cloud-computing model. Thus, the components of the EADS 106 may be implemented as part of a stand-alone application on a personal computing device or a mobile device.

FIGS. 1-12, the corresponding text, and the examples provide a number of different systems, methods, and non-transitory computer readable media for providing application access to multiple devices associated with multiple user accounts of an enterprise account. In addition to the foregoing, embodiments can also be described in terms of flowcharts comprising acts for accomplishing a particular result. For example, FIG. 13 illustrates a flowchart of an example sequence of acts in accordance with one or more embodiments.

Figure 13:
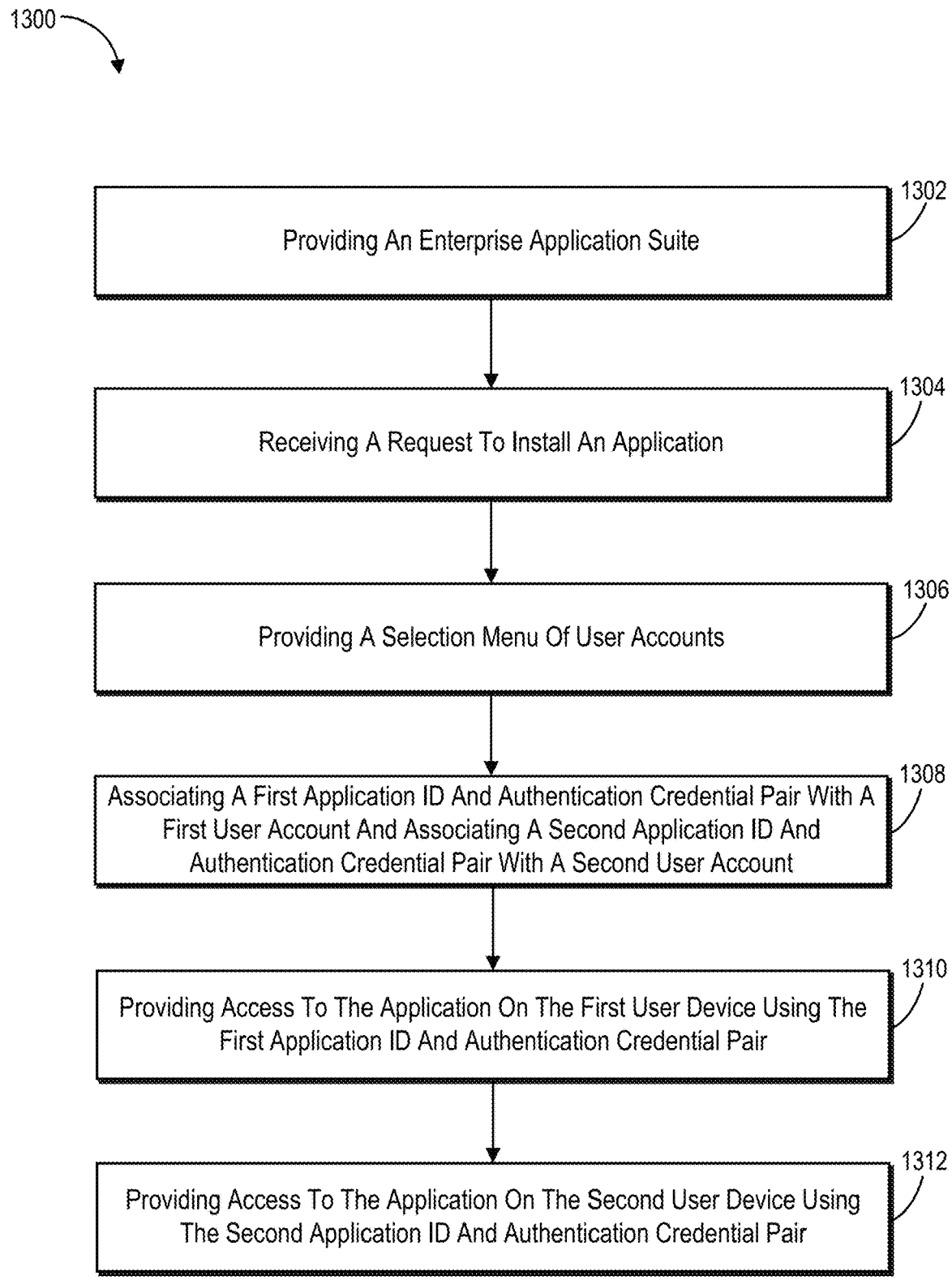
FIG. 13 illustrates a flowchart of a series of acts for providing application access to multiple user accounts associated with an enterprise account in accordance with one or more embodiments.

While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIG. 13. In still further embodiments, a system can perform the acts of FIG. 13. Additionally, the acts described herein may be repeated or performed in parallel with one another or in parallel with different instances of the same or other similar acts.

As illustrated in FIG. 13, the EADS 106 performs an example series of acts 1300, including an act 1302 to provide an enterprise application suite, which includes a group of applications, to an administrator device associated with an enterprise account including a group of user accounts. For example, the EADS 106 can provide an enterprise application suite with applications that include a workforce management application, a workforce optimization application, a quality assurance application, and/or a voice analytics application.

The EADS 106 further performs an act 1304 to receive, from the administrator device, a request to install an application from the group of applications of the enterprise application suite. In some embodiments, the EADS 106 notifies a developer system 116 that can determine whether to accept or reject the installation request. Additionally, the EADS 106 can relay to a subscriber system 118, including the administrator device, the decision of the developer system 116 to accept or reject the installation request.

The EADS 106 further performs an act 1306 to provide, in response to the request to install the application, to the administrator device a selection menu comprising a list of the user accounts corresponding to the enterprise account. In some embodiments, the EADS 106 may cause to display the selection menu may with different types of user accounts, including groups of user accounts, individual user accounts, departments of user accounts, clearance levels of user accounts, etc. In particular, the selection menu may be configured to receive user inputs that select, deselect, or otherwise provide indications of a selection/deselection of user accounts.

The EADS 106 further performs an act 1308 to, in response to receiving an indication of a selection of a first user account and a second user account from the list of user accounts corresponding to the enterprise account, associate a first application ID and authentication credential pair with the first user account and associate a second application ID and authentication credential pair with a second user account. In some embodiments, the first application ID and authentication credential pair is different from the second application ID and authentication credential pair.

Further, in some embodiments of act 1308, the EADS 106 associates the first application ID and authentication credential pair with the first user account using public key cryptography and/or associates the second application ID and authentication credential pair with the second user account using public key cryptography. Additionally or alternatively, the EADS 106 can associate the first application ID and authentication credential pair with a supervisor account, and the second application ID and authentication credential pair with an agent account. In these or other embodiments, the EADS 106 may provide a first clearance level to the first user account (e.g., the supervisor account) by associating the first clearance level with the first application ID and authentication credential pair, and the EADS 106 may provide a second clearance level to the second user account (e.g., the agent account) by associating the second clearance level with the second application ID and authentication credential pair, wherein the second clearance level provides less clearance than the first clearance level.

The EADS 106 further performs an act 1310 to provide, to a first user device associated with the first user account, access to the application on the first user device using the first application ID and authentication credential pair. In some embodiments, the EADS 106 automatically provides access to the application on the first user device after granting the first user device access to the first user account associated with the enterprise account.

Additionally, the EADS 106 performs an act 1312 to provide, to a second user device associated with the second user account, access to the application on the second user device using the second application ID and authentication credential pair. In some embodiments, the EADS 106 automatically provides access to the application on the second user device after granting the second user device access to the second user account associated with the enterprise account.

It is understood that the outlined acts in the series of acts 1300 are only provided as examples, and some of the acts may be optional, combined into fewer acts, or expanded into additional acts without detracting from the essence of the disclosed embodiments. As an example of an additional act not shown in FIG. 13, an act in the series of acts 1300 may include the EADS 106 determining clearance levels within the application for the enterprise account. As another example act not shown in FIG. 13, an act in the series of acts 1300 may include the EADS 106 causing the system to sync with a developer system that approves access changes to the application in the enterprise account.

As another example act not shown in FIG. 13, an act in the series of acts 1300 may include, in response to receiving an indication of a selection of a third user account from the list of user accounts corresponding to the enterprise account, the EADS 106 associating a third application ID and authentication credential pair with the third user account. In still yet another example act not shown in FIG. 13, an act in the series of acts 1300 may include the EADS 106, providing, to a third user device associated with the third user account, access to the application on the third user device using the third application ID and authentication credential pair. Furthermore, in yet another example act not shown in FIG. 13, an act in the series of acts 1300 may include the EADS 106 causing the system to cancel the access changes for the third user account when the access changes for the third user account fail to sync with the developer system within a threshold sync time. In these or other embodiments, the threshold sync time includes an amount of time for which access changes can be approved, disapproved, reviewed, remain pending, etc.

In another example act not shown in FIG. 13, an act in the series of acts 1300 may include the EADS 106 causing the computer system to, in response to receiving an indication of a deselection of the second user account from the list of user accounts corresponding to the enterprise account, disassociate the second application ID and authentication credential pair with the second user account to remove access to the application on the second user device. In these or other embodiments, the second application ID and authentication credential pair is independent of other application ID and authentication credential pairs such that removing access to the application on the second user device does not affect access to any other third-party application on the second user device and does not affect access to the application on the first user device.

In yet another example act not shown in FIG. 13, an act in the series of acts 1300 may include the EADS 106, in response to the request to install the application, notifying the administrator device of one or more data reports the application is configured to access. Additionally, in an example act not shown in FIG. 13, an act in the series of acts 1300 may include the EADS 106 providing, to a developer system 116 that manages development of the application, an application programming interface (API) menu that includes one or more APIs of a plurality of APIs to integrate enterprise data corresponding to subscribed events of the enterprise account with the application. In another example act not shown in FIG. 13, an act in the series of acts 1300 may include the EADS 106 automatically integrating enterprise data with the application using one or more APIs. In still yet another example act not shown in FIG. 13, an act in the series of acts 1300 may include the EADS 106 causing the system to determine clearance levels within the application for the enterprise account. In these or other embodiments, the enterprise account may be associated with a call center enterprise.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this disclosure, a "cloud-computing environment" is an environment in which cloud computing is employed.

Figure 14:
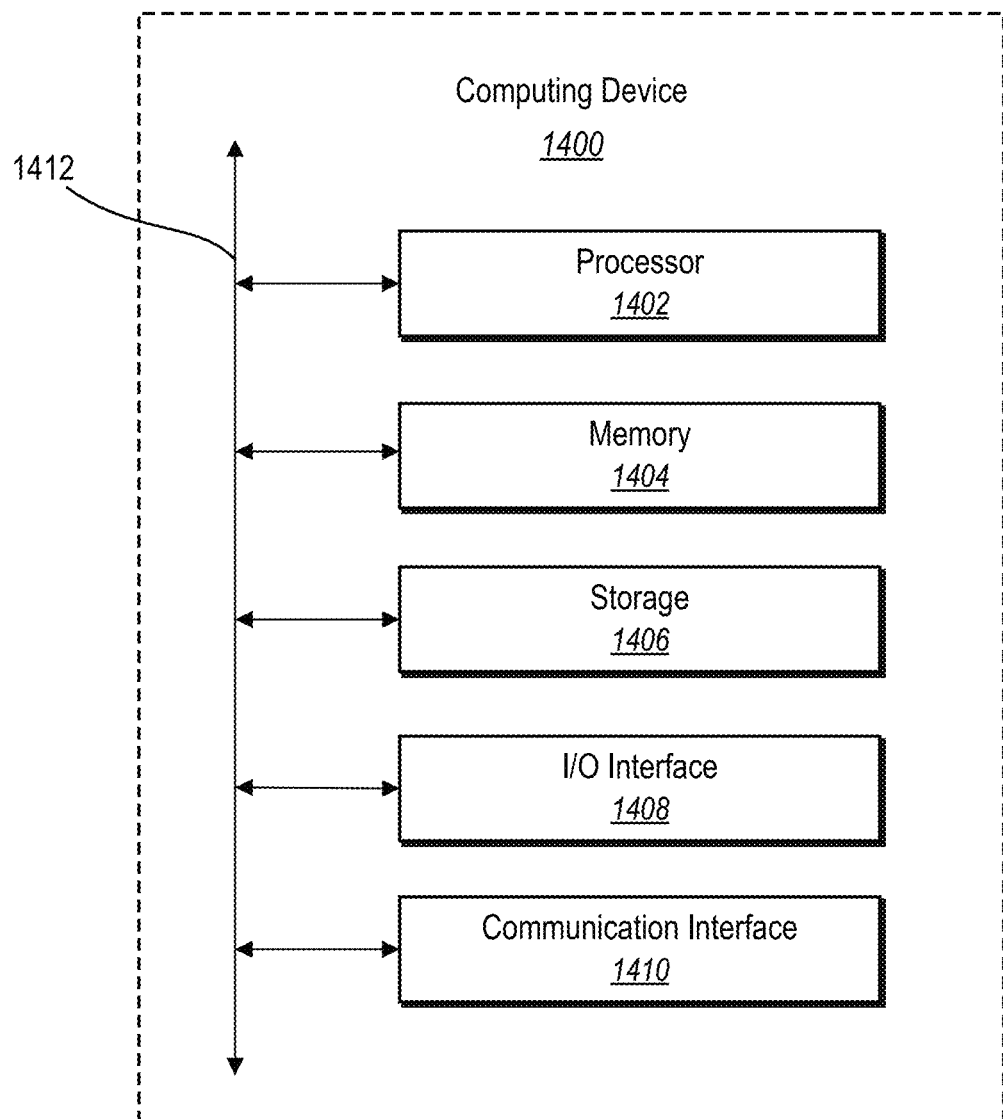
FIG. 14 illustrates an example computing device in accordance with one or more embodiments.

FIG. 14 illustrates, in block diagram form, an example computing device 1400 (e.g., the computing device 1200, the user devices 120-128, 602, 702, 802, 902, the developer devices 202, 302, 402, and/or the server(s) 102) that may be configured to perform one or more of the processes described above. One will appreciate that the EADS 106 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couple components of computing device 1400 to each other.

Figure 15:
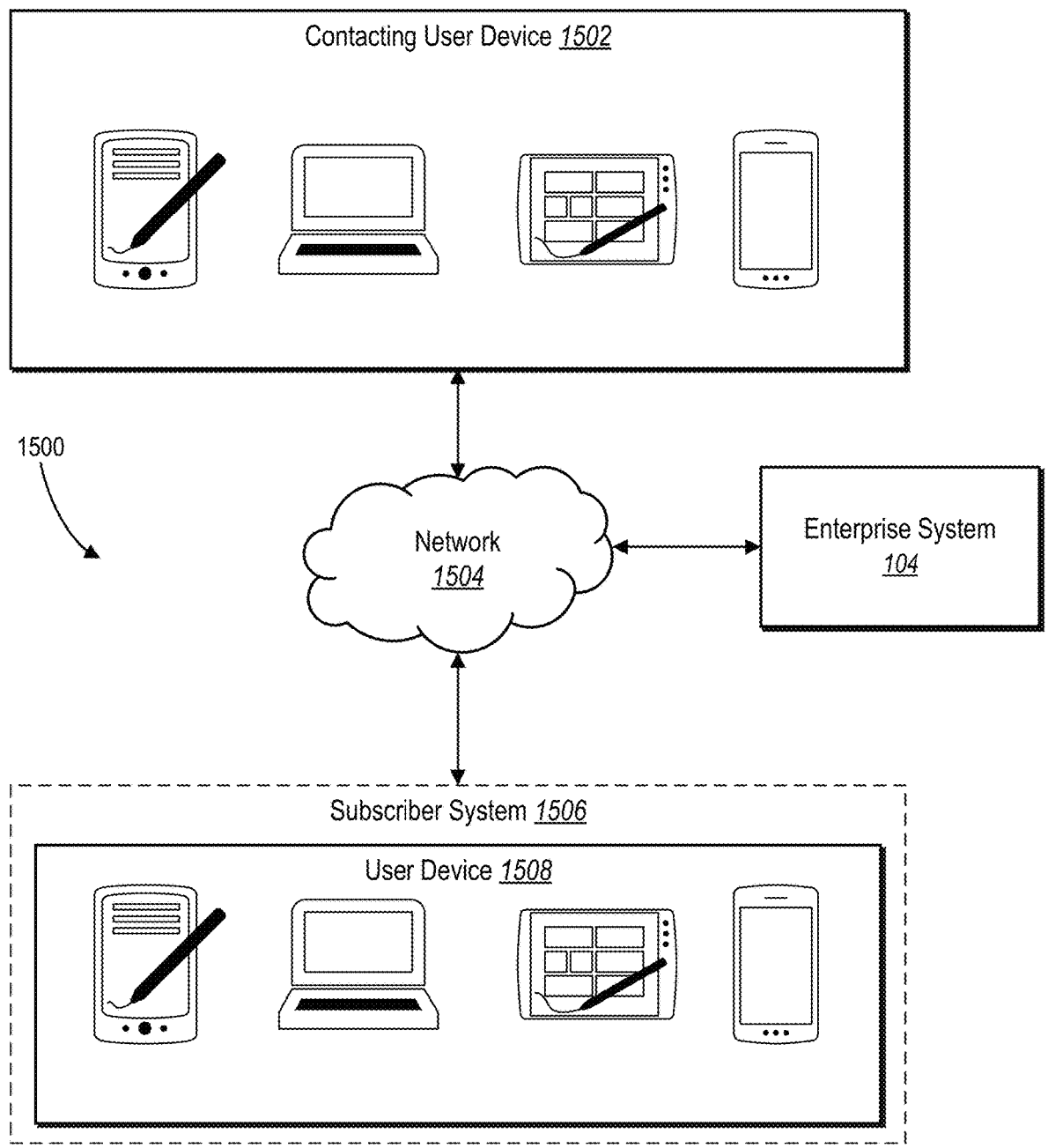
FIG. 15 illustrates an example network environment in accordance with one or more embodiments.

FIG. 15 illustrates an example network environment 1500 of an enterprise system 104, arranged according to one or more embodiments of the present disclosure. The network environment 1500 includes a contacting user device 1502 (e.g., a customer device), an enterprise system 104, a subscriber system 1506 (e.g., the subscriber system 118), and a user device 1508 (e.g., the user device 120) connected to each other by a network 1504 (e.g., the network 114). Although FIG. 15 illustrates a particular arrangement of the contacting user device 1502, the enterprise system 104, the user device 1508, the subscriber system 1506, and network 1504, this disclosure contemplates any suitable arrangement of the contacting user device 1502, the enterprise system 104, the subscriber system 1506, the user device 1508, and the network 1504. As an example, and not by way of limitation, two or more of the contacting user device 1502, the enterprise system 104, the user device 1508, and the subscriber system 1506 may be connected to each other directly, bypassing network 1504. As another example, two or more of the contacting user device 1502, the enterprise system 104, the user device 1508, and the subscriber system 1506 may be physically or logically co-located with each other in whole or in part. Moreover, although FIG. 15 illustrates a particular number of contacting user devices 1502, enterprise systems 104, user devices 1508, subscriber systems 1506, and networks 1504, this disclosure contemplates any suitable number of contacting user devices 1502, enterprise systems 104, user devices 1508, subscriber systems 1506, and networks 1504. As an example, and not by way of limitation, network environment 1500 may include multiple contacting user devices 1502, enterprise systems 104, user devices 1508, subscriber systems 1506, and networks 1504.

This disclosure contemplates any suitable network 1504. As an example, and not by way of limitation, one or more portions of the network 1504 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1504 may include one or more networks 1504.

Links may connect the contacting user device 1502, the enterprise system 104, the user device 1508, and the subscriber system 1506 to the network 1504 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links.

Links need not necessarily be the same throughout network environment 1500. One or more first links may differ in one or more respects from one or more second links.

In particular embodiments, the contacting user device 1502 and/or user device 1508 may be an electronic device including hardware, software, or embedded logic components or a combination of two or more such components capable of carrying out the appropriate functionalities implemented or supported by the contacting user device 1502 and/or user device 1508. As an example, and not by way of limitation, a contacting user device 1502 or user device 1508 may include any of the computing devices discussed above in relation to FIG. 12. A contacting user device 1502 may enable a network user (e.g., a contacting user) at the contacting user device 1502 to access the network 1504. A contacting user device 1502 may enable its user to communicate with other users at other contacting user devices 1502 and/or user devices 1508. Likewise, a user device 1508 may enable its user to communicate with contacting user devices 1502, the subscriber system 1506, and/or the enterprise system 104.

In particular embodiments, the user device 1508 is part of (e.g., housed within, either entirely or in part) the subscriber system 1506. For example, the subscriber system 1506 may include a service system which maintains one or more agent users, each associated with a separate user device 1508. Accordingly, the enterprise system 104 provides various functionality, user interfaces, electronic communications, and other information to the user device 1508 via the subscriber system 1506. In other embodiments, the user device 1508 is not associated with or part of a subscriber system 1506. Rather, the user device 1508 refers to a client device associated directly with the enterprise system 104 or a different third-party and that communicates with the enterprise system 104 without interaction via the subscriber system 1506.

In particular embodiments, the contacting user device 1502 and/or the user device 1508 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at contacting user device 1502 and/or user device 1508 may enter a Uniform Resource Locator (URL) or other address directing the web browser to a particular server (such as server, or a server associated with a subscriber system 1506), and the web browser may generate a Hyper Text Transfer Protocol (HTTP) request or Hyper Text Transfer Protocol Secure request and communicate the HTTP/HTTPS request to server. The server may accept the HTTP/HTTPS request and communicate to the contacting user device 1502 (or the user device 1508) one or more Hyper Text Markup Language (HTML) files responsive to the HTTP/HTTPS request. The contacting user device 1502 and/or user device 1508 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, enterprise system 104 may be capable of linking a variety of entities. As an example, and not by way of limitation, enterprise system 104 may enable users such as contacting users and agent users to interact with each other as well as receive content from subscriber systems 1506 or other entities (e.g., the developer system 116), or to allow users to interact with these entities through an application programming interfaces (API) or other communication channels.

In particular embodiments, a subscriber system 1506 may include one or more types of servers, one or more data stores, one or more interfaces, including but not limited to APIs, one or more web services, one or more content sources, one or more networks, or any other suitable components, e.g., that servers may communicate with. A subscriber system 1506 may be operated by a different entity from an entity operating enterprise system 104. In particular embodiments, however, enterprise system 104 and subscriber systems 1506 may operate in conjunction with each other to provide communication services to users of enterprise system 104 or subscriber systems 1506. In this sense, enterprise system 104 may provide a platform, or backbone, which other systems, such as subscriber systems 1506, may use to provide communication services and functionality to users across the Internet or other network.

In particular embodiments, a subscriber system 1506 may include a third-party service system. A third-party content service system may include one or more sources of products or services that are used by contacting user. As an example, and not by way of limitation, a service system can include a call center system, a traffic monitoring system, a social networking system, an emergency reporting system, a home repair system, a weather monitoring system, an internet service provider system, an airline system, a transportation provider system, a news media system, a travel accommodation system, an electronic smart appliance distribution or monitoring system, or a power distribution or monitoring system.

In particular embodiments, the enterprise system 104 may include a variety of servers, sub-systems, programs, modules, logs, and data stores. In particular embodiments, the enterprise system 104 may include one or more of the following: a web server, action logger, API-request server, notification controller, action log, inference module, search module, advertisement-targeting module, user-interface module, user-profile store, third-party content store, or location store. The enterprise system 104 may also include suitable components such as network interfaces, security mechanisms, load balancers, failover servers, management-and-network-operations consoles, other suitable components, or any suitable combination thereof. In particular embodiments, the enterprise system 104 may include one or more contacting user-profile stores for storing contacting user profiles (e.g., for contacting users). A user profile may include, for example, contacting user information, biographic information, demographic information, behavioral information, social information, or other types of descriptive information, such as work experience, educational history, hobbies or preferences, interests, affinities, or location.

The web server may include a mail server or other messaging functionality for receiving and routing messages between enterprise system 104 and one or more contacting user devices 1502 or user devices 1508. An API-request server may allow a subscriber system 1506 to access information from the enterprise system 104 by calling one or more APIs. An action logger may be used to receive communications from a web server about a user's actions on or off enterprise system 104. Information may be pushed to a contacting user device 1502 and/or user device 1508 as notifications, or information may be pulled from contacting user device 1502 responsive to a request received from contacting user device 1502 or user device 1508.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
    at least one processor; and
    at least one non-transitory computer-readable storage medium storing instructions that, when executed by the at least one processor, cause the system to:
        provide an enterprise application suite comprising a plurality of applications to an administrator device associated with an enterprise account comprising a plurality of user accounts;
        receive, from the administrator device, a request to install an application from the plurality of applications of the enterprise application suite;
        in response to the request to install the application, provide to the administrator device a selection menu comprising a list of the user accounts corresponding to the enterprise account;
        in response to receiving an indication of a selection of a first user account and a second user account from the list of user accounts corresponding to the enterprise account, associate a first application ID and authentication credential pair with the first user account and associate a second application ID and authentication credential pair with a second user account, wherein the first application ID and authentication credential pair is different from the second application ID and authentication credential pair;
        provide, to a first user device associated with the first user account, access to the application on the first user device using the first application ID and authentication credential pair; and
        provide, to a second user device associated with the second user account, access to the application on the second user device using the second application ID and authentication credential pair;
        sync with a developer system that approves access changes to the application in the enterprise account; and
        in response to receiving an indication of a selection of a third user account from the list of user accounts corresponding to the enterprise account, perform access changes to the application by:
            associating a third application ID and authentication credential pair with the third user account,
            providing, to a third user device associated with the third user account, access to the application on the third user device using the third application ID and authentication credential pair, and
            cancelling the access changes for the third user account when the access changes for the third user account fail to sync with the developer system within a threshold sync time.

2. The system of claim 1, further comprising instructions that, when executed by the at least one processor, cause the system to:
    automatically provide access to the application on the first user device after granting the first user device access to the first user account associated with the enterprise account; and
    automatically provide access to the application on the second user device after granting the second user device access to the second user account associated with the enterprise account.

3. The system of claim 1, further comprising instructions that, when executed by the at least one processor, cause the system to, in response to the request to install the application, notify the administrator device of one or more data reports the application is configured to access.

4. The system of claim 1, further comprising instructions that, when executed by the at least one processor, cause the system to determine clearance levels within the application for the enterprise account.

5. The system of claim 4, further comprising instructions that, when executed by the at least one processor, cause the system to:
    provide a first clearance level to the first user account by associating the first clearance level with the first application ID and authentication credential pair; and
    provide a second clearance level to the second user account by associating the second clearance level with the second application ID and authentication credential pair.

6. The system of claim 1, further comprising instructions that, when executed by the at least one processor, cause the system to automatically integrate enterprise data with the application using one or more application programming interfaces.

7. The system of claim 1, further comprising instructions that, when executed by the at least one processor, cause the system to:
    associate the first application ID and authentication credential pair with a supervisor account; and
    associate the second application ID and authentication credential pair with an agent account.

8. A non-transitory computer-readable medium storing instructions that, when executed by at least one processor, cause a computer system to:
    provide an enterprise application suite comprising a plurality of applications to an administrator device associated with an enterprise account comprising a plurality of user accounts;

receive, from the administrator device, a request to install an application from the plurality of applications of the enterprise application suite;

in response to the request to install the application, provide to the administrator device a selection menu comprising a list of the user accounts corresponding to the enterprise account;

in response to receiving an indication of a selection of a first user account and a second user account from the list of user accounts corresponding to the enterprise account, associate a first application ID and authentication credential pair with the first user account and associate a second application ID and authentication credential pair with a second user account, wherein the first application ID and authentication credential pair is different from the second application ID and authentication credential pair;

provide, to a first user device associated with the first user account, access to the application on the first user device using the first application ID and authentication credential pair; and provide, to a second user device associated with the second user account, access to the application on the second user device using the second application ID and authentication credential pair;

sync with a developer system that approves access changes to the application in the enterprise account; and in response to receiving an indication of a selection of a third user account from the list of user accounts corresponding to the enterprise account, perform access changes to the application by:

associating a third application ID and authentication credential pair with the third user account, providing, to a third user device associated with the third user account, access to the application on the third user device using the third application ID and authentication credential pair, and cancelling the access changes for the third user account when the access changes for the third user account fail to sync with the developer system within a threshold sync time.

9. The non-transitory computer-readable medium of claim 8, wherein the enterprise account is associated with a call center enterprise.

10. The non-transitory computer-readable medium of claim 8, wherein the first user account is a supervisor account and the second user account is an agent account, and further comprising instructions that, when executed by the at least one processor, cause the computer system to:

associate the first application ID and authentication credential pair with the supervisor account; and associate the second application ID and authentication credential pair with the agent account.

11. The non-transitory computer-readable medium of claim 10, further comprising instructions that, when executed by the at least one processor, cause the computer system to:

provide a first clearance level to the supervisor account by associating the first clearance level with the first application ID and authentication credential pair; and provide a second clearance level to the agent account by associating the second clearance level with the second application ID and authentication credential pair, the second clearance level providing less clearance than the first clearance level.

12. The non-transitory computer-readable medium of claim 8, further comprising instructions that, when executed by the at least one processor, cause the computer system to implement a single sign-on access protocol to:

automatically provide access to the application on the first user device after granting the first user device access to the first user account associated with the enterprise account; and automatically provide access to the application on the second user device after granting the second user device access to the second user account associated with the enterprise account.

13. The non-transitory computer-readable medium of claim 8, further comprising instructions that, when executed by the at least one processor, cause the computer system to, in response to receiving an indication of a deselection of the second user account from the list of user accounts corresponding to the enterprise account, disassociate the second application ID and authentication credential pair with the second user account to remove access to the application on the second user device.

14. The non-transitory computer-readable medium of claim 13, wherein the second application ID and authentication credential pair is independent of other application ID and authentication credential pairs such that removing access to the application on the second user device does not affect access to any other third-party application on the second user device and does not affect access to the application on the first user device.

15. The non-transitory computer-readable medium of claim 8, further comprising instructions that, when executed by the at least one processor, cause the computer system to automatically integrate enterprise data with the application using one or more application programming interfaces.

16. A computer-implemented method comprising:

providing an enterprise application suite comprising a plurality of applications to an administrator device associated with an enterprise account comprising a plurality of user accounts;

receiving, from the administrator device, a request to install an application from the plurality of applications of the enterprise application suite;

in response to the request to install the application, providing to the administrator device a selection menu comprising a list of the user accounts corresponding to the enterprise account;

in response to receiving an indication of a selection of a first user account and a second user account from the list of user accounts corresponding to the enterprise account, associating a first application ID and authentication credential pair with the first user account and associating a second application ID and authentication credential pair with a second user account, wherein the first application ID and authentication credential pair is different from the second application ID and authentication credential pair;

providing, to a first user device associated with the first user account, access to the application on the first user device using the first application ID and authentication credential pair; and providing, to a second user device associated with the second user account, access to the application on the second user device using the second application ID and authentication credential pair;

sync with a developer system that approves access changes to the application in the enterprise account; and in response to receiving an indication of a selection of a third user account from the list of user accounts corresponding to the enterprise account, perform access changes to the application by:
- associating a third application ID and authentication credential pair with the third user account,
- providing, to a third user device associated with the third user account, access to the application on the third user device using the third application ID and authentication credential pair, and
- cancelling the access changes for the third user account when the access changes for the third user account fail to sync with the developer system within a threshold sync time.

17. The computer-implemented method of claim 16, further comprising: in response to the request to install the application, notifying the administrator device of one or more data reports the application is configured to access.

18. The computer-implemented method of claim 16, further comprising:
- providing, to a developer system that manages development of the application, an application programming interface (API) menu that includes one or more APIs of a plurality of APIs to integrate enterprise data corresponding to subscribed events of the enterprise account with the application.

19. The computer-implemented method of claim 16, wherein the application is a workforce management application, a workforce optimization application, a quality assurance application, or a voice analytics application.

20. The computer-implemented method of claim 16, further comprising:
- providing a first clearance level to the first user account by associating the first clearance level with the first application ID and authentication credential pair; and
- providing a second clearance level to the second user account by associating the second clearance level with the second application ID and authentication credential pair.

* * * * *